(12) United States Patent  
Post et al.

(10) Patent No.: US 7,755,765 B2  
(45) Date of Patent: Jul. 13, 2010

(54) METHOD AND APPARATUS FOR INERTIAL SENSING VIA MEASUREMENT OF TRAPPED ORBIT DYNAMICS

(75) Inventors: Ernest Rehmi Post, Somerville, MA (US); Neil Gershenfeld, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1491 days.

(21) Appl. No.: 10/802,998

(22) Filed: Mar. 17, 2004

(65) Prior Publication Data

US 2004/0239937 A1 Dec. 2, 2004

Related U.S. Application Data

(60) Provisional application No. 60/455,185, filed on Mar. 17, 2003.

(51) Int. Cl.
*G01B 9/02* (2006.01)
*G01P 15/08* (2006.01)
*G01P 15/13* (2006.01)

(52) U.S. Cl. .................................. 356/450; 73/514.26
(58) Field of Classification Search ................. 356/450; 73/382 R, 382 G, 514.18, 514.19, 514.25, 73/514.26
See application file for complete search history.

(56) References Cited

U.S. PATENT DOCUMENTS

| 3,065,640 | A |   | 11/1962 | Langmuir et al. |
| 3,808,550 | A | * | 4/1974  | Ashkin ........................ 372/97 |
| 3,858,451 | A | * | 1/1975  | Stiles ....................... 73/514.19 |
| 3,965,753 | A | * | 6/1976  | Browning, Jr. ............ 73/514.19 |
| 3,992,953 | A | * | 11/1976 | Ljung et al. ............... 73/514.19 |
| 4,384,487 | A | * | 5/1983  | Browning ................. 73/382 G |
| 4,419,891 | A | * | 12/1983 | Browning ................. 73/382 G |
| 4,819,486 | A | * | 4/1989  | Kunkel et al. ............. 73/382 R |
| 4,874,942 | A | * | 10/1989 | Clauser .................... 73/382 G |
| 4,992,656 | A | * | 2/1991  | Clauser .................... 73/382 G |
| 5,050,435 | A | * | 9/1991  | Pinson .................... 73/514.19 |
| 6,867,411 | B2| * | 3/2005  | Kelleher et al. .......... 73/514.19 |

* cited by examiner

*Primary Examiner*—Patrick Connolly
(74) *Attorney, Agent, or Firm*—Charles G. Call

(57) ABSTRACT

An inertial sensor consisting of an electrodynamic trap for suspending one or more charged particles and a readout device for measuring variations in the position or motion of the particles when the trap is subjected to acceleration forces. Particle may be measured by optical interferometry, optical leverage, resonant electric field absorption, or by producing an image of the particle motion and processing the image data to obtain values representing the acceleration forces on the trap in one to six degrees of freedom. The electrodynamic trap employs electrodes to which a time-varying potential are applied to produce a quadupole field that constrains the charged particles to a specific location between said electrodes by a substantially linear, tunable restoring force.

41 Claims, 20 Drawing Sheets

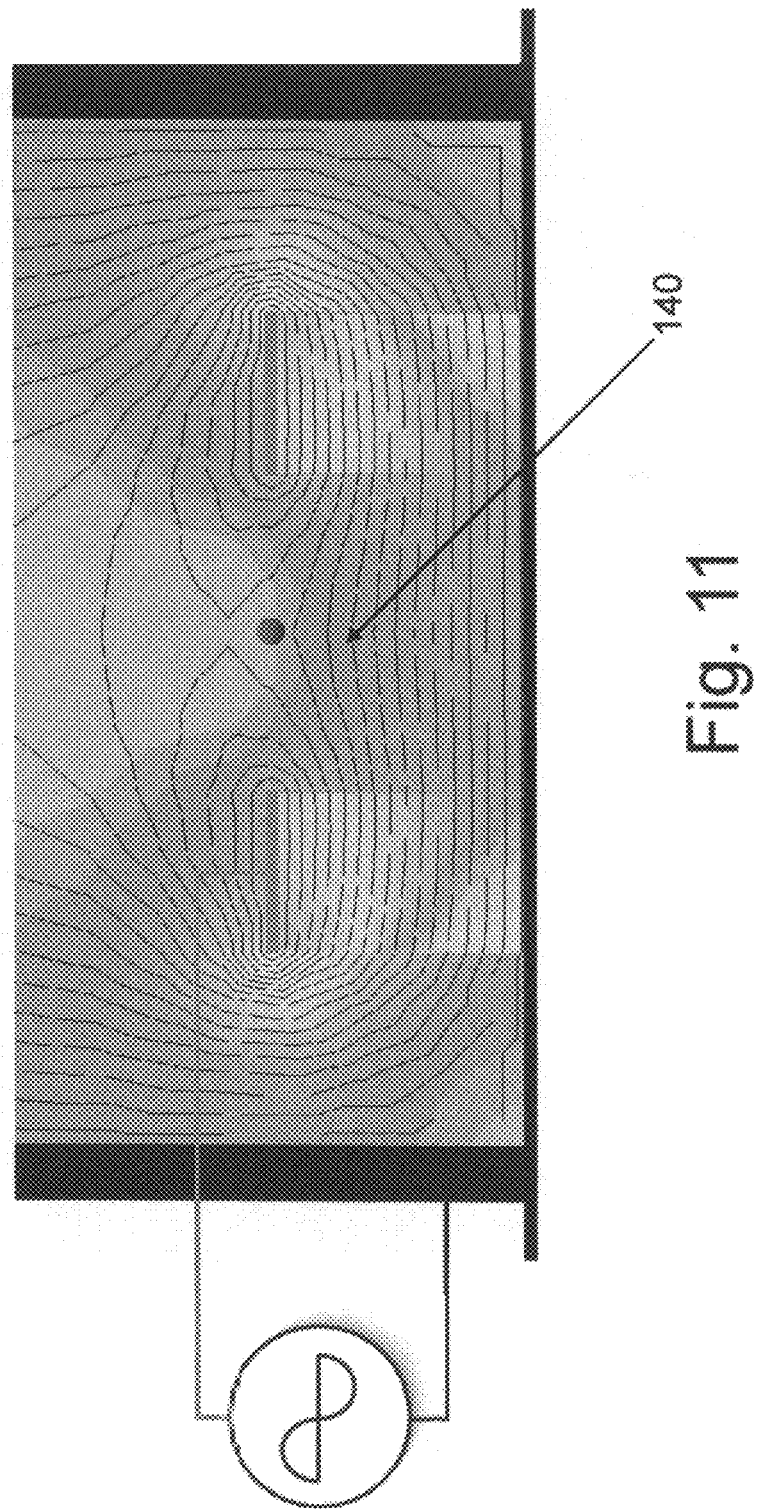

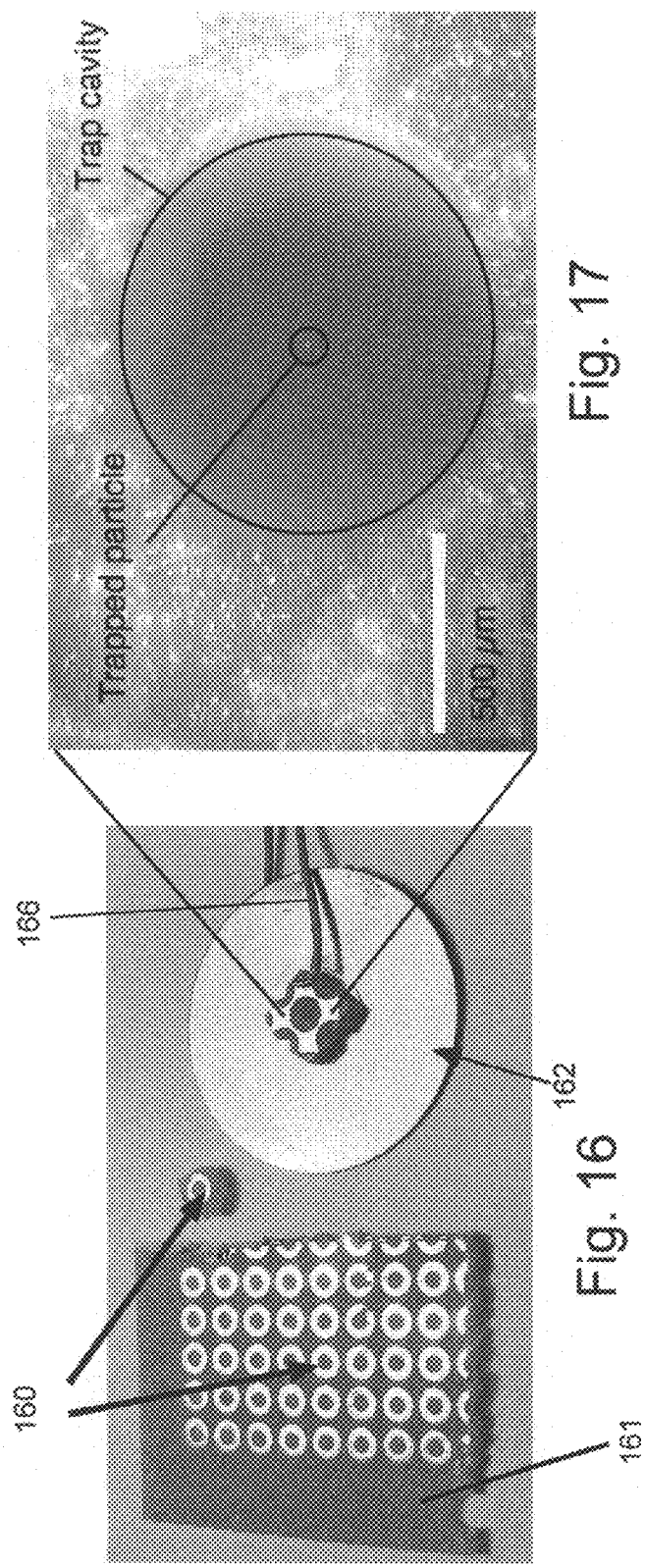

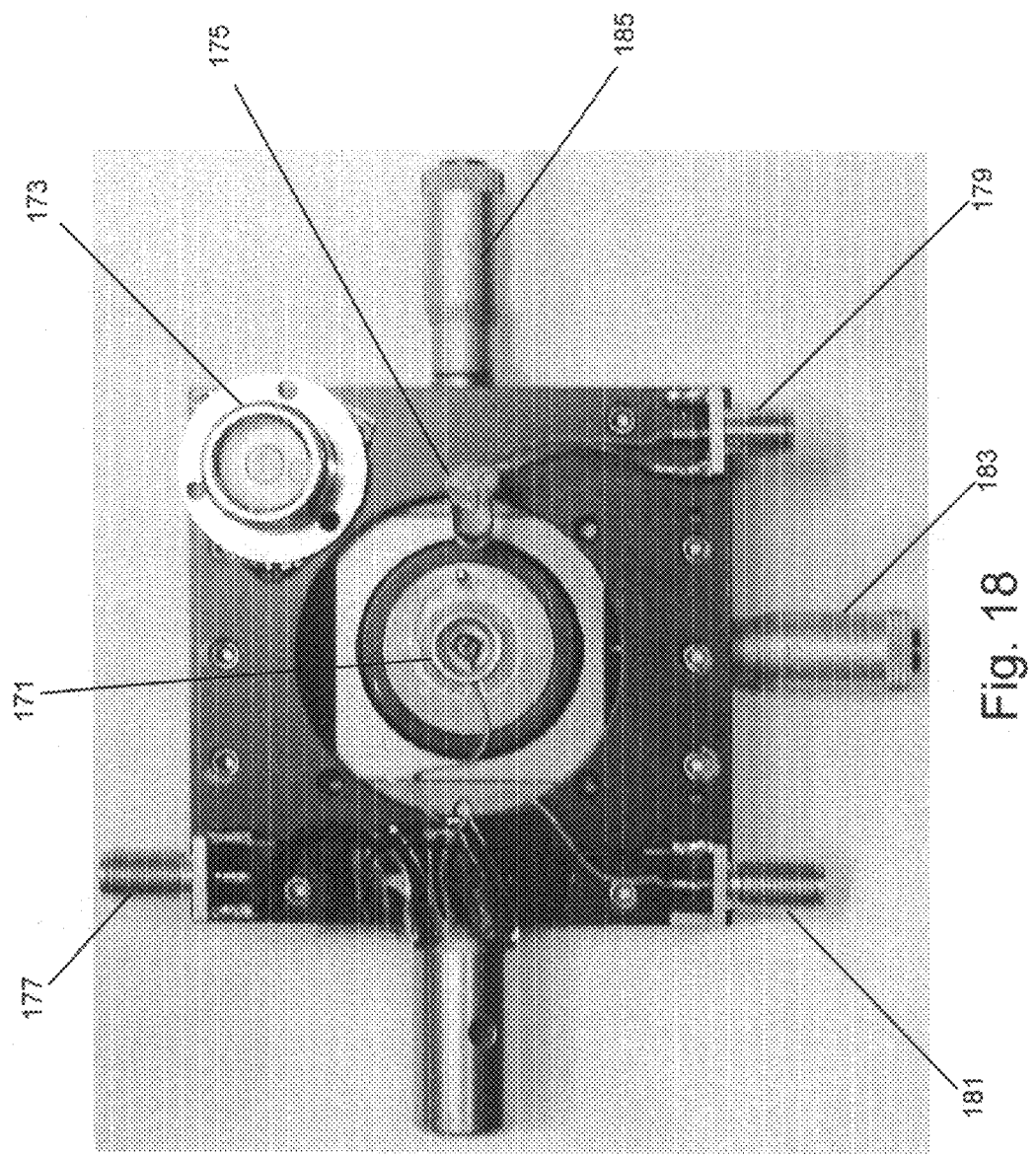

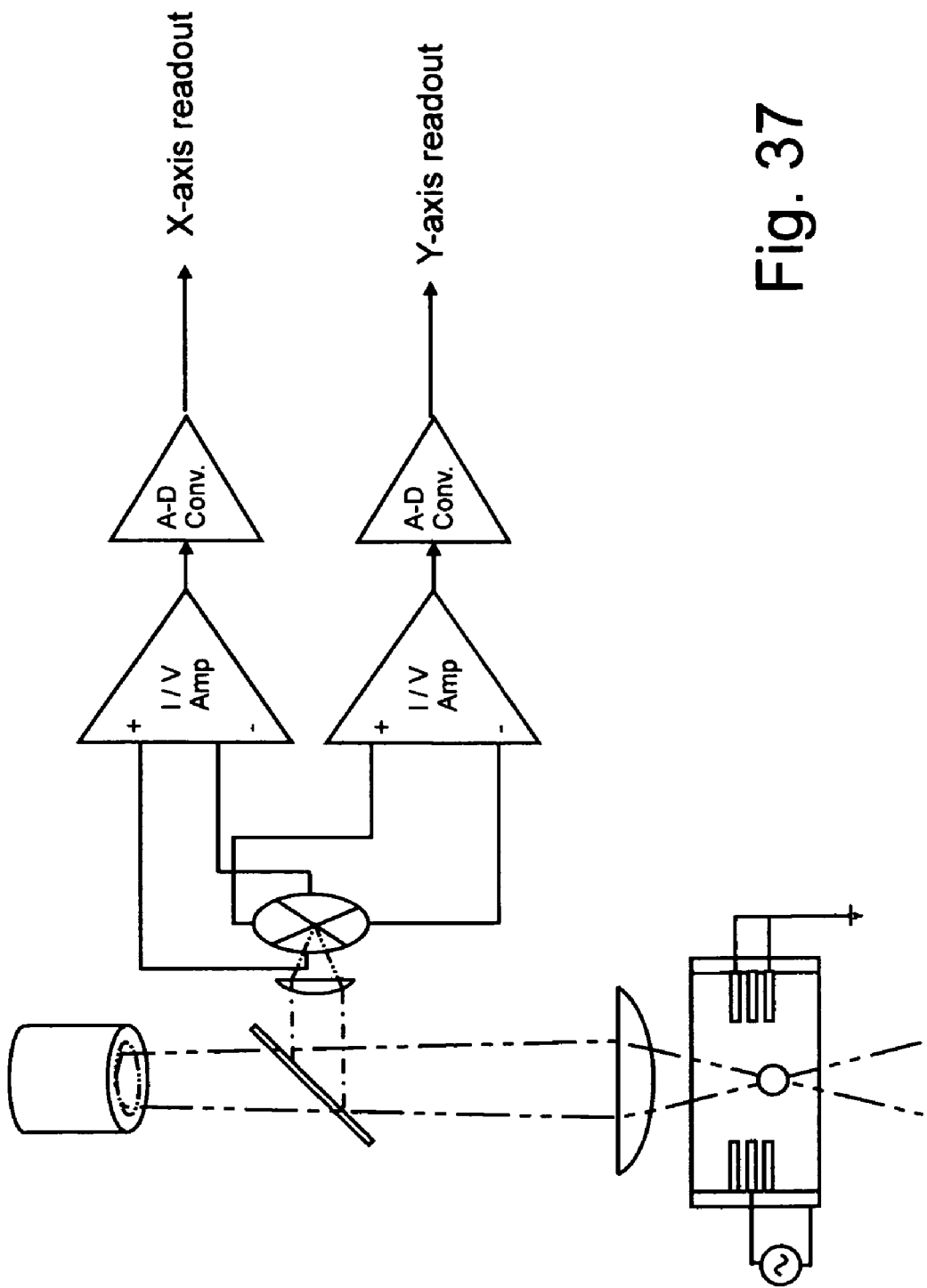

METHOD AND APPARATUS FOR INERTIAL SENSING VIA MEASUREMENT OF TRAPPED ORBIT DYNAMICS

CROSS REFERENCE TO RELATED APPLICATIONS

This application is a Non-Provisional of U.S. patent application Ser. No. 60/455,185 filed Mar. 17, 2003, the disclosure of which is incorporated herein by reference.

FIELD OF THE INVENTION

This invention relates to methods and apparatus for trapping particles and to methods and apparatus for sensing acceleration forces by measuring the position and/or motion of trapped particles.

BACKGROUND AND SUMMARY OF THE INVENTION

A trapped particle acts like a mass on a spring, but the restoring forces are provided by electrodynamics. Using the invention, exquisitely machined physical mechanisms can be replaced by carefully tuned mechanical physics, yielding inertial sensors that are simpler to build yet exhibit superior performance because their operating parameters can be dynamically controlled.

An accelerometer can be most simply described as a mass on a spring, at equilibrium with the local acceleration field, combined with some means to read out the equilibrium position and thereby infer the applied acceleration. This simplified model of an accelerometer is employed in most of the exposition to follow.

For many years the market for inertial measurement devices was restricted to defense and aerospace applications in which the devices were optimized for high accuracy and low bias. The production of these devices was limited, and both their price and complexity remained high.

The first accurate, mass-manufactured accelerometers were micromachined interferometric ("MEMS") devices that found application as automotive collision detectors. See, for example, the Analog Devices ADXL202/ADXL210 product datasheet, "Low Cost±2 g/±10 g Dual Axis iMEMS Accelerometers with Digital Output, (Analog Devices, Norwood, Mass., 1999). Since then, new applications and markets for accelerometers have begun to emerge, but none yet have a volume comparable to the automotive market. One might reasonably argue that other applications have not yet emerged because available inertial sensors still do not meet niche requirements including: price per degree of freedom, physical sensor size, sensitivity, bandwidth, and drift.

The present invention employs particle traps to provide accelerometers of a new kind. Particle traps are key to many of today's most sensitive and accurate metrological techniques. They are commonly used as mass balances and spectrometers, and also provide the isolation and control necessary to manipulate atoms, ions, and electrons singly or in stable ensembles for arbitrarily long intervals. The present invention provides a new use for such suspended structures as inertial sensors.

The present invention takes the form of an inertial sensor consisting of an electrodynamic trap for suspending one or more charged particles and a readout device for measuring variations in the position or motion of the particles when the trap is subjected to acceleration forces. Particle position and/or motion may be measured by optical interferometry, optical leverage, resonant electric field absorption, or by producing an image of the particle motion and processing the image data to obtain values representing the acceleration forces on the trap in one to six degrees of freedom. The electrodynamic trap employs electrodes to which a time-varying potential are applied to produce a quadupole field that constrains the charged particles to a specific location between said electrodes by a substantially linear, tunable restoring force.

A practical, manufacturable sensor requires a simple, accurate readout technique such as optical interferometry, optical leverage, or resonant electric field absorption. However, to allow flexibility in construction and characterization of our sensors, the preferred embodiment which will be described below uses metrological techniques based on video microscopy and particle tracking by image processing.

Since the prototype accelerometers are large structures with many mechanical resonances, characterization is performed at known applied static accelerations by rotating the trap in the earth's gravitational field. To demonstrate the tunability of the trap, operating parameters such as guiding potential scale and frequency are also varied. Since the image of a particle on the sensor covers several pixels, particle positions may be determined to sub-pixel resolution by simple interpolation. Although video microscopy affords a high pixel bandwidth (on the order of MHz), the temporal resolution of image features is limited to the frame rate (tens of Hz). While this does not greatly limit long-term drift or bias measurements, we would like to perform measurements of the noise spectral density over a wider band. Accordingly, a second experiment is devised to provide a readout of a particle's motional noise from the reflected intensity profile as it intersects the waist of a focused beam. The measurement is calibrated by the application of small static accelerations.

BRIEF DESCRIPTION OF THE DRAWINGS

In the detailed description which follows, frequent reference will be made to the attached drawings, in which:

FIG. 11 is a reproduction of a finite-element calculation depicting the field geometry in a half-planar particle trap;

FIG. 16 is a photograph of a printed circuit board and piezoelectric disk actuator used in the construction of a half-planar particle trap;

FIG. 17 is a close-up photograph of the trap cavity in the half-planar particle trap seen in FIG. 16;

FIG. 18 is a photograph showing the construction of a positionable planar trap module;

FIG. 37 is a schematic diagram of a readout device using a quadrant photodiode to detect backscattered light from a particle in the waist of a focused beam.

DETAILED DESCRIPTION

Introduction

Figure 1:
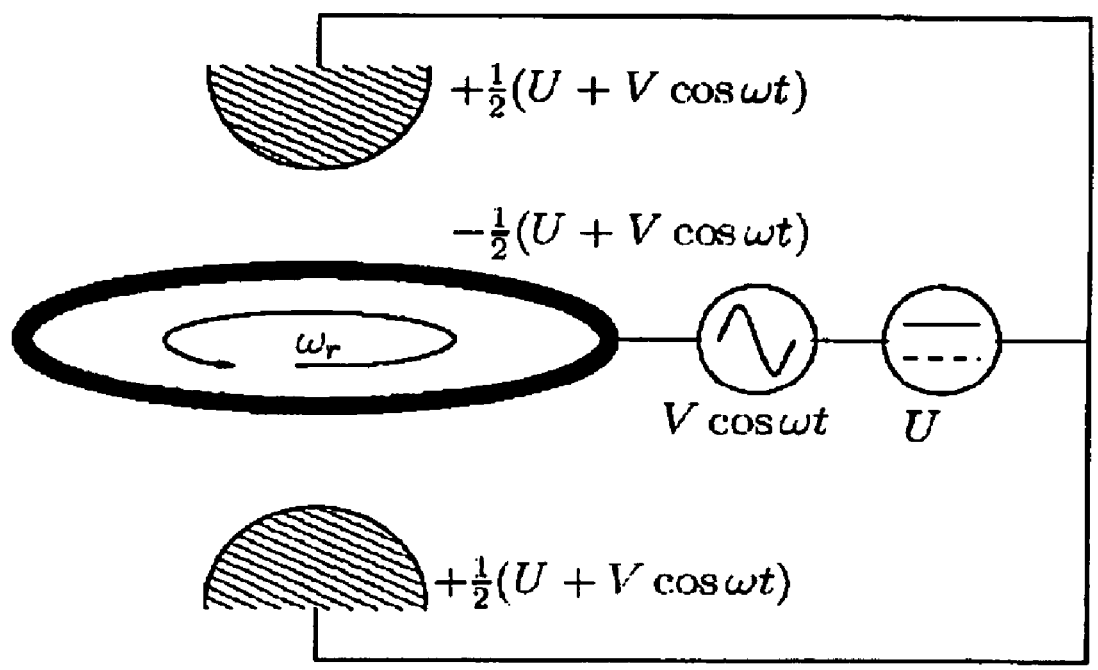
FIG. 1 is a schematic drawing of a Paul trap.
Figure 2:
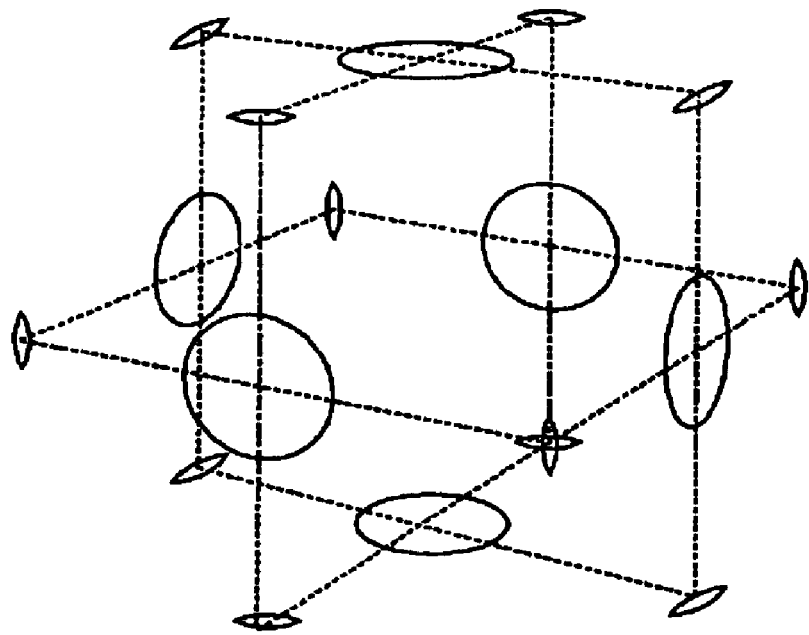
FIG. 2 illustrates the isosurfaces which define the electrode geometry of a Paul trap.

The description that follows begins with an mathematical analysis showing how one or more particles can be stably constrained within a trap by a substantially linear restoring force. Thereafter, the behavior of several trap configurations is explored based on both numerical simulations and physical prototypes. Finally, practical inertial sensing devices are described which employ low-cost planar structures for trapping particles whose motion is then by image processing techniques.

Trap Dynamics

To use a particle trap as an inertial sensor it is necessary to determine how the trap dynamics depend on inertial perturbations. To a surprising degree, trapped particles can be considered to be elastically constrained to a point by an effective linear restoring force. As with any approximation, several caveats pertain. The guiding fields of an electrodynamic trap cannot have arbitrary geometries, as Maxwell's equations disallow free-standing, static electric potential minima. While it is not possible to create a static potential that acts like a spring, it is possible to create a time-dependent potential that focuses charged particles to stable equilibria. The end effect is that particles can be stably constrained to a fixed coordinate based on their charge and mass as well as the spectrum of guiding fields applied to the trap.

One well known form of electrodynamic particle trap was described by Wolfgang Paul in his paper, *Electromagnetic traps for charged and neutral particles*, Rev. Mod. Phys. 62, 531-540 (1990). The main structure of a conventional Paul trap consists of two parts: a ring and two end caps. The ring is an annular ring-hyperboloid of revolution whose symmetry is about the x-y plane at z=0. The distance from the origin to the ring focus of the hyperboloid is called $r_0$. The inner surface of this ring electrode is a time-dependent electrical equipotential surface. The two end caps are hyperboloids of revolution about the z axis. The distance from the origin to the two foci is usually $r_0/\sqrt{2}$. The two end-cap surfaces are time-dependent equipotential surfaces with sign opposite to that of the ring. The electrical field within this trap is a quadrupole field. When oscillatory potentials are applied, a charged particle suspended in the trap can be dynamically stable.

The Paul paper cited above suggests a mechanical analog: a ball put at the center of a saddle surface. With no motion of the surface, the ball will fall off the saddle. However, if the saddle surface is rotated with an appropriate frequency about the axis normal to the surface at the inflection point, the particle will be stably confined. Like the ball, a particle suspended in a Paul trap is oscillatory about the origin both in the x and in the y direction. However, its oscillation in the z direction is restricted to be bounded from below by some $z_0>0$. A more detailed mathematical analysis of electrodynamic traps and their electrode geometry s presented below Analysis of Electrodynamic Particle Traps The following discussion will consider only electrodynamic particle traps, of which the Paul trap [?] is a canonical form. A particle is said to be trapped if it is elastically bound to an axis or coordinate in space by a restoring force. For simplicity we consider a particle bound by a linear restoring force $\vec{F}=-\vec{k}\cdot\vec{r}$, implying a quadratic potential $$W\alpha(\alpha x^2+\beta y^2+\gamma z^2) \tag{1}$$

surrounding the constraint coordinate. As the system evolves classically to minimize its potential energy, the particle's motion describes an orbit centered about the minimum of this parabolic potential. Such a potential is preferred because it is one of only two potentials that leads to harmonic motion—the other being an inverse-law ($r^{-1}$) potential.

The Paul trap assumes a parabolic potential geometry and a harmonic time dependence $$\Phi(\vec{r},t) = \frac{\Phi_0}{a_0^2}(\alpha x^2 + \beta y^2 + \gamma z^2) \tag{2}$$

where $a_0$ is the absolute scale of the trap, determined by its three characteristic radii $$a_0^2 = |\alpha|x_0^2 + |\beta|y_0^2 + |\gamma|z_0^2 \tag{3}$$

and $\Phi_0$ is the time-dependent potential $$\Phi_0 = U + V\cos\omega_0 t \tag{4}$$

The potential difference between the ring electrode and the end caps is $\Phi_0$ and the corresponding force acting on the particle is $$\vec{F}(\vec{r},t) = -e\nabla\Phi(\vec{r},t). \tag{5}$$

Writing out the Hamiltonian for this system, we add a potential energy term to account for accelerational shifts $\vec{s}(t)$ of the trapping frame:

$$H = T + V = \frac{p^2}{2m} + \Phi(\vec{x}, t)q + m(\vec{s}(t) \cdot \vec{x}) \tag{6}$$

From this Hamiltonian we obtain the system's equations of evolution $$\dot{\vec{x}} = \partial_{\vec{p}} H = \frac{1}{m}\vec{p} \tag{7}$$

$$\dot{\vec{p}} = -\partial_{\vec{x}} H = -m\vec{s} - \frac{\Phi_0 e}{a_0^2}\begin{bmatrix} 2x \\ 2y \\ -4z \end{bmatrix}$$

which may be restated as the equations of motion (driven by applied acceleration)

$$\begin{bmatrix} \ddot{x} \\ \ddot{y} \\ \ddot{z} \end{bmatrix} + \frac{\Phi_0 e}{ma_0^2}\begin{bmatrix} 2x \\ 2y \\ -4z \end{bmatrix} = \begin{bmatrix} s_x \\ s_y \\ s_z \end{bmatrix} \tag{8}$$

The motion X(t) of a trapped particle may be considered to have two components—the secular motion S(t) and the micromotion M(S, t), where S>>M (the secular motion is much larger than the micromotion) and $\dot{S}<<\dot{M}$ (the secular motion is much slower than the micromotion). This may be written as $$X(t)=S(t)+M(S, t) \tag{9}$$

noting that M is considered to be a perturbation of the motion which depends on S. Micromotion occurs on a fast time scale (compared to the secular motion)

$$\tau = \frac{2\pi}{\omega_0} \tag{10}$$

and averages to zero in a single period. An approximate solution for M(S, t) is found to be $$M(S, t) \simeq -\frac{1}{m\omega_0^2} f(S)\cos\omega_0 t \tag{11}$$

where the micromotion M is approximately harmonic with frequency ω, phase opposite to the driving signal, amplitude depending on the secular motion, and average kinetic energy $$\langle k_M \rangle = \frac{f^2(S)}{4m\omega_0^2} \tag{12}$$

To develop an inertial measurement device, we must find an inertial signature appearing in this system. By assuming that a trapped particle oscillates harmonically to first order as it moves in a quadratic pseudopotential $\phi_{ps}$ we find that this oscillation has a secular frequency $\omega_s = \beta_s \omega (0 \leq \beta_s \leq 1)$, distinct from the particle's micromotion at the trap frequency ω.

Letting the Hamiltonian for a particle trapped in a pseudo-potential and subject to an acceleration s be $$H = \frac{p^2}{2m} + \varphi_{ps}(x) + msx = \frac{1}{2m}(p^2 + \kappa x^2) + msx \quad \text{where } \kappa = \left(\frac{eV}{\omega_0 a_0^2}\right)^2 \tag{13}$$

the equation of motion will be that of the driven harmonic oscillator $$\ddot{x} + \omega_s^2 x = -s \tag{14}$$

where $\omega_s^2 = k/m$. By substituting the general solution $x = \vec{x} + c_0 e^{i\omega_s t} + c_1 e^{-i\omega_s t}$ into this equation, one quickly finds that the particle oscillates about a mean position $$\bar{x} = \langle x \rangle = -\frac{1}{\omega_s^2} s = -\frac{m^2 \omega_s^2 a_0^4}{e^2 V^2} s. \tag{15}$$

This mean position is equivalent to the secular position S(t) identified above. Recalling that the micromotion M depends on S≈$\vec{x}$, the RMS amplitude of M($\vec{x}$, t) is found to be $$\sqrt{\langle M(\bar{x}, t)^2 \rangle} = \left[\frac{1}{\tau}\int_0^\tau \left(\frac{eV}{m\omega_0^2}\right)^2 \cos^2\omega_0 t \left(\frac{2\bar{x}}{a_0^2}\right)^2 dt\right]^{\frac{1}{2}} = \sqrt{2}\frac{eV}{m\omega_0^2}\frac{\bar{x}}{a_0^2} \tag{16}$$

Finally, by substituting the mean value $\vec{x}$ from above into the RMS amplitude $$M^{rms} = \sqrt{\langle M(\bar{x}, t)^2 \rangle} = \frac{eV}{m\omega_0^2}\frac{\sqrt{2}}{a_0^2}\bar{x} = -\frac{\omega_s^2}{\omega^2}\frac{ma_0^2\sqrt{2}}{eV}s \tag{17}$$

one finds that $\vec{x}$ and $M^{rms}$ both depend linearly on the applied acceleration s. We have learned that a trapped particle has two constants of motion directly proportional to applied acceleration, and that these constants of motion are decoupled for all three degrees of freedom.

Because readout of acceleration is taken to be α=−kx/m, the scale of thermal noise effects in acceleration measurements will be $$|\langle \delta\alpha \rangle| = \frac{\kappa}{m}\langle \delta x \rangle = \sqrt{\frac{\kappa k_B T}{m^2}} = \frac{eV}{m\omega_0 a_0^2}\sqrt{\frac{k_B T}{m}} \tag{18}$$

The Paul trap described above has a preferred axis and a corresponding radial symmetry, adequate for applications in which particles are constrained to motion in the plane. In developing an inertial measurement unit, however, it is preferable to have equivalent equations of motion in all three directions.

In Paul's two-phase systems, the electrode geometry is defined by isosurfaces of the potential Φ corresponding to the phase factors 1 and −1. This can be generalized to multi-phase systems with isosurfaces defined by the modulus of Φ and partitioned by its phase. For example, the complex geometric factors $$\alpha = 1, \beta = e^{i\pi\frac{2}{3}}, \gamma = e^{i\pi\frac{4}{3}} \qquad (19)$$

(i.e., complex cube roots of unity) will satisfy the trapping condition. The isosurfaces of this form are the solutions of $|\Phi|=c$, yielding the polytope $$(x^2-y^2)^2+(y^2-z^2)^2+(z^2-x^2)^2=2a_0c^2 \qquad (20)$$

As shown above, the motion of a particle in a Paul trap has two (leading) characteristic timescales corresponding to a slow secular motion S(t) and a fast micromotion M(S, t). These in turn depend linearly on an inertial term in the trap's governing equation. This inertial signature is expected to be a robust effect in traps with quadratic confining potentials. These effects have been demonstrated in both numerical and physical experiments.

Numerical Simulation of an Inertial Measurement Trap

To observe the previously derived inertial terms in simulation, we numerically integrated the six linear, coupled differential equations obtain the partical motion. Parameters were chosen to simulate the operation of a macroscopic oil droplet trap and a time-dependent acceleration sz was applied to accelerate the trap upward. The relevant parameters used were:

| | |
|---|---|
| $x_0, y_0$ | 2.5 mm |
| $z_0$ | 5.0 mm |
| U | 0 v |
| V | 1.0 kV |
| $\omega$ | $2\pi$ 100 Hz |
| $r_{particle}$ | 10 μm |
| $m_{particle}$ | 9.3 μgm |
| $e_{particle}$ | 1.3 mC/gm | while the simple dissipation term has a prefactor $\upsilon=10$, chosen to provide an underdamped simulation.

Figure 3:
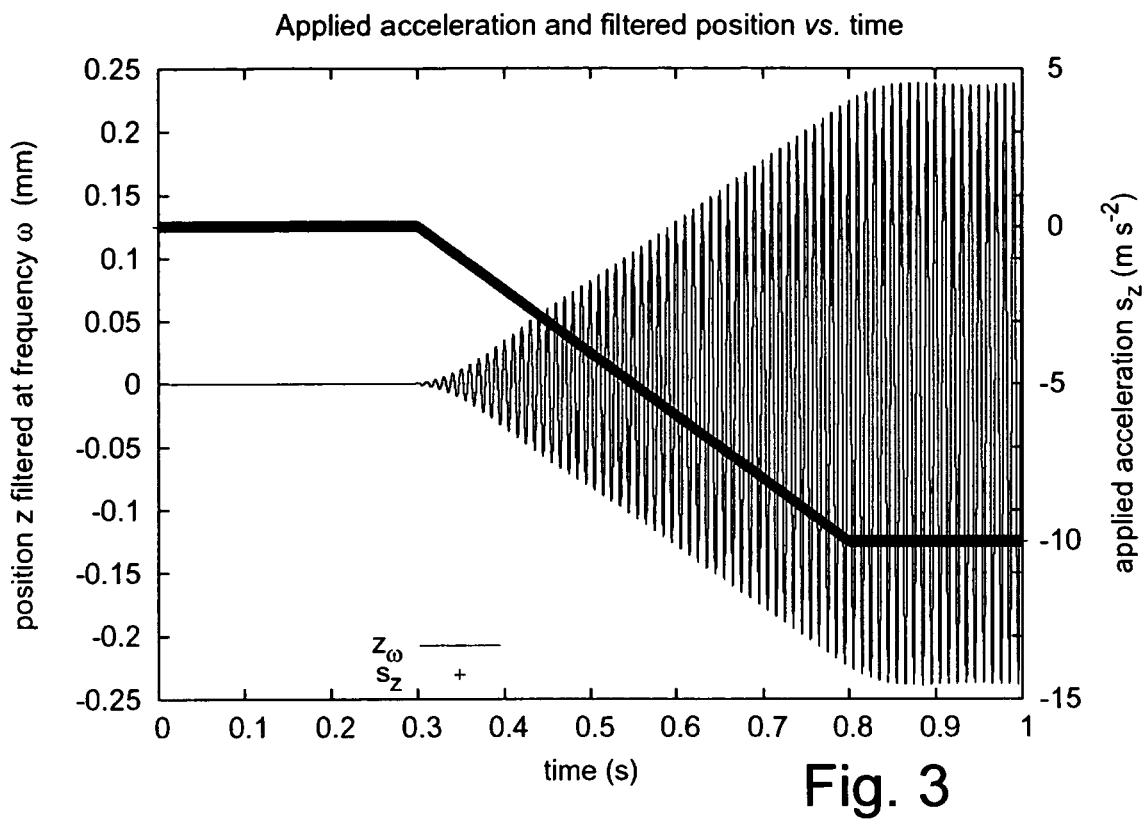
FIG. 3 is a graph of the results of a simulation comparing particle micromotion with applied acceleration.

The results are shown in FIG. 3 of the drawings which depicts the simulation of particle micromotion as the thin line varying from 0 to plus and minus 0.25 mm as the applied acceleration $s_z$ is increased from 0 to $-10$ m s$^{-2}$ as the simulated trap is accelerated upwardly. FIG. 3 illustrates the linear relationship between the particle motion and acceleration. In this case, the particle position z is filtered in a narrow band around the excitation frequency $\omega$ by a third-order Chebyshev FIR filter. This filtering leads to the time-delayed response seen in the graph.

Figure 4:
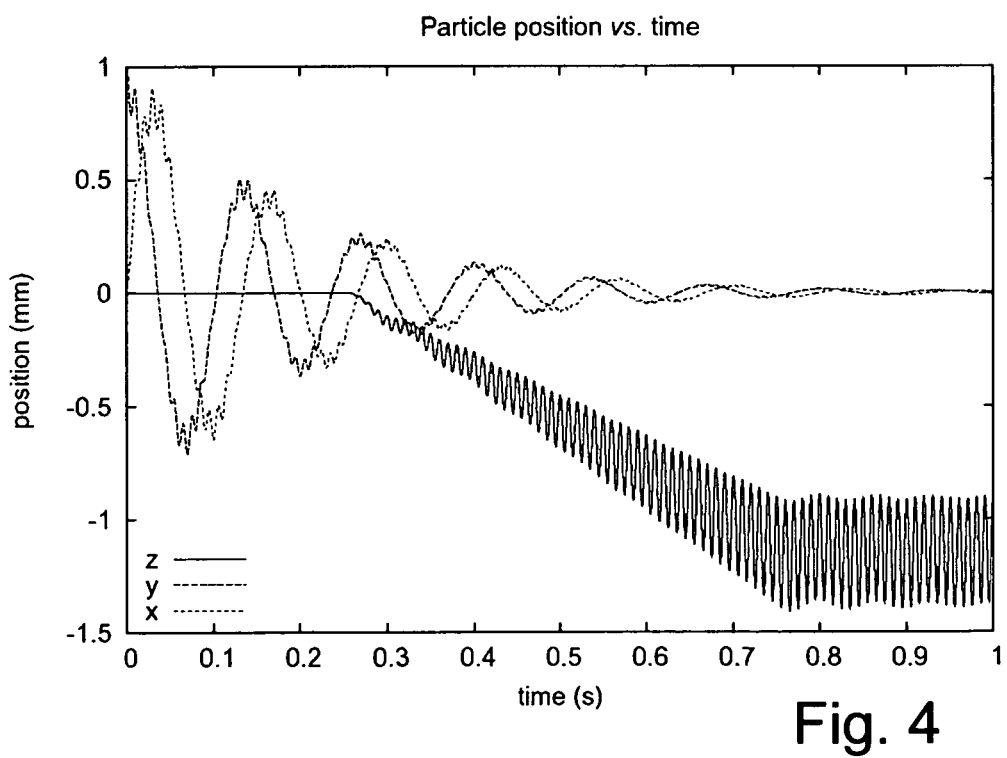
FIG. 4 is a graph showing the simulated particle trajectory in a trap in each axis.

The linear relationship of micromotion on acceleration is also apparent in the graphs of position vs. time shown in FIG. 4 for each of the particle's Cartesian coordinates. The particle's orbit starts out from the injection point (x, y, z)=(0, 1, 0) and is seen to decay due to damping. As the particle moves farther from equilibrium on any axis, its micromotion along that axis increases. From t=0.25 to 0.75 s, the applied acceleration sz is ramped down, causing variations in micromotion amplitude and the mean position z.

Figure 5:
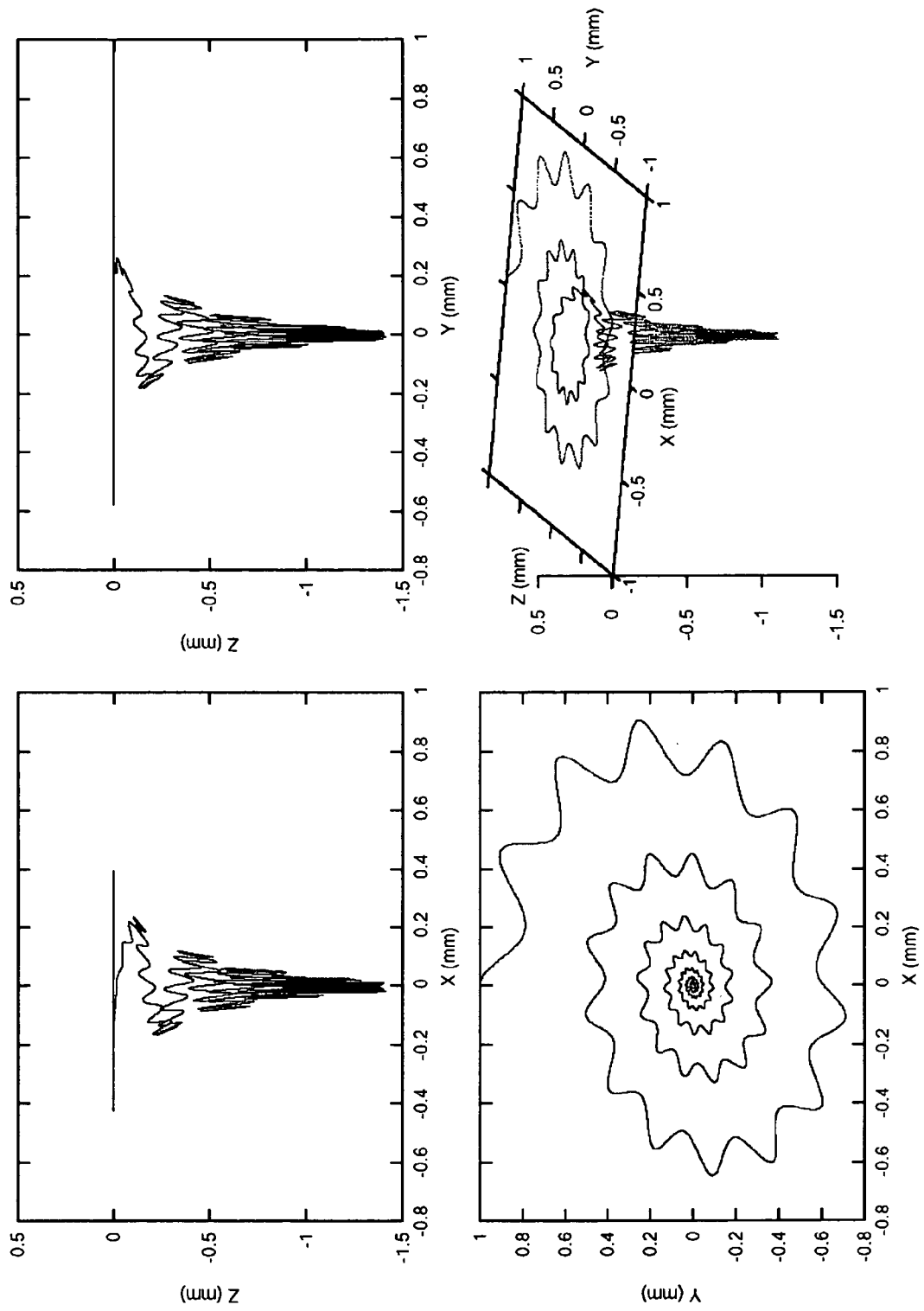
FIG. 5 show projections of the simulated particle trajectory along the x, y and z axis, and in perspective.

Finally, FIG. 5 shows the particle's trajectory projected onto the three principle planes and in a rotated orthogonal projection. The orbit in the xy plane is seen to decay toward equilibrium, even as the equilibrium point moves downward and the micromotion in z increases.

This simulation is representative of several numerical experiments run with parameters corresponding to stable trapping and suggests that it is reasonable to seek similar results in physical experiments.

Physical Realization of Paul Traps

Figure 6:
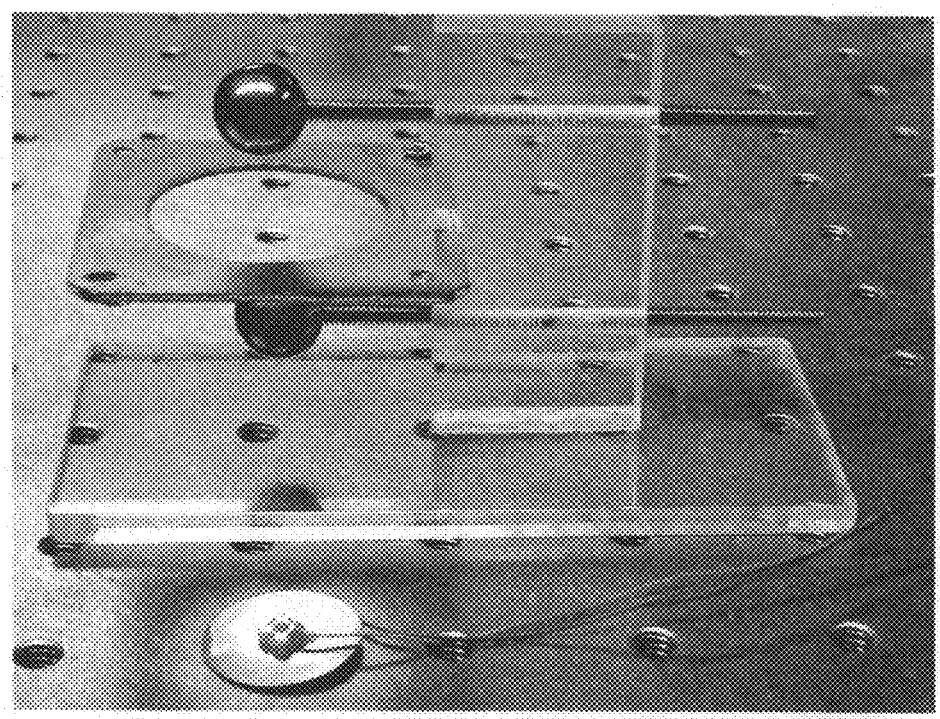
FIG. 6 is a photograph showing a demonstration particle trap and a smaller, simplified planar trap.

The classic Paul trap is an exquisite assembly of precision-machined hyperboloid shells. In practice, however, almost any quadrupolar arrangement of electrodes will yield a workable trap. A common configuration of electrodes such as might be used in a classroom demonstration is shown in the background of FIG. 6, and was used to create the images in FIGS. 7 and 8. See ROBERTSON, S., AND YOUNGER, R. Coulomb crystals of oil droplets. American Journal of Physics 67, 4 (April 1999), 310-315.

FIG. 4.5 shows a common version of the Paul trap along with a Coulomb crystal structure consisting of 49 mutually repelling charged microspheres. The spheres appear as streaks because of their micromotion within the trap, and it can be seen that particles further from the equilibrium position (the trap center) have larger motion amplitude than those close to the center.

An extensive body of literature describes the application of linear quadrupole and hyperboloidal traps, particularly in the fields of mass spectrometry and aerosol microscopy. See, for example, HOFFNAGLE, J., AND BREWER, R. G. Frequency-locked motion of two particles in a Paul trap, Physical Review Letters 71, 12 (20 Sep. 1993), 1828-1831; and Robertson and Younger, cited above.

Typically these techniques cancel the gravitational acceleration on a suspended sample by application of a static, homogenous electric field that balances the particle in the center of the trap and thus minimizes its micromotion.

By imaging a particle balanced in the plane of a hyperboloidal trap, one observes its amplitude of micromotion to depend on accelerations applied to the trap as well as gravitational acceleration, as discussed above. Furthermore, trapped many-body structures such as Coulomb or Wigner-Seitz "crystals" (See TAN, J. N., BOLLINGER, J. J., JELENKOVIC, B., AND WINELAND, D. J. Long-range order in laser-cooled, atomic-ion Wigner crystals observed by Bragg scattering. Phys. Rev. Lett. 75 (1995), 4198-4201), formed by the mutual repulsion of charged particles in a potential minimum, are known to demonstrate rigid-body dynamics, including conservation of angular momentum (See HUANG, X.-P., BOLLINGER, J. J., MITCHELL, T. B., AND ITANO, W. M. Phase-locked rotation of crystallized non-neutral plasmas by rotating electric fields. Phys. Rev. Lett. 80 (1998), 73-76).

Figure 8:
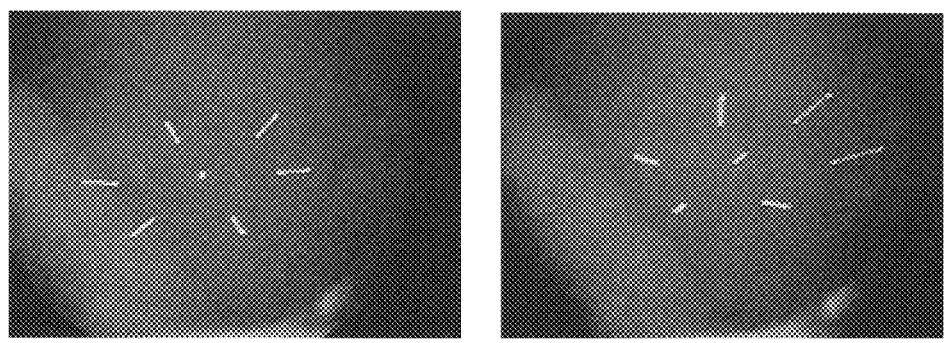
FIG. 8 consists of two photographs showing a Coulomb crystal of seven charged particles with and without applied acceleration.

A Coulomb crystal of 7 charged particles in the z=0 trapping plane without an acceleration applied in the plane is shown at the left in FIG. 8, while the photograph at the right in FIG. 8 shows the crystal with acceleration applied. On the left, the central particle of a Coulomb crystal appears as a dot because it is at the equilibrium position, while the surrounding particles exhibit similar amounts of micromotion according to their similar displacements from the center. On the right, the trap is accelerated toward the lower left coener of the image and the crystal is displaced from equilibrium. The central particle now appears as a streak, exhibiting a micromotion amplitude that corresponds to the applied amplitude.

A Practical Trap

Figure 9:
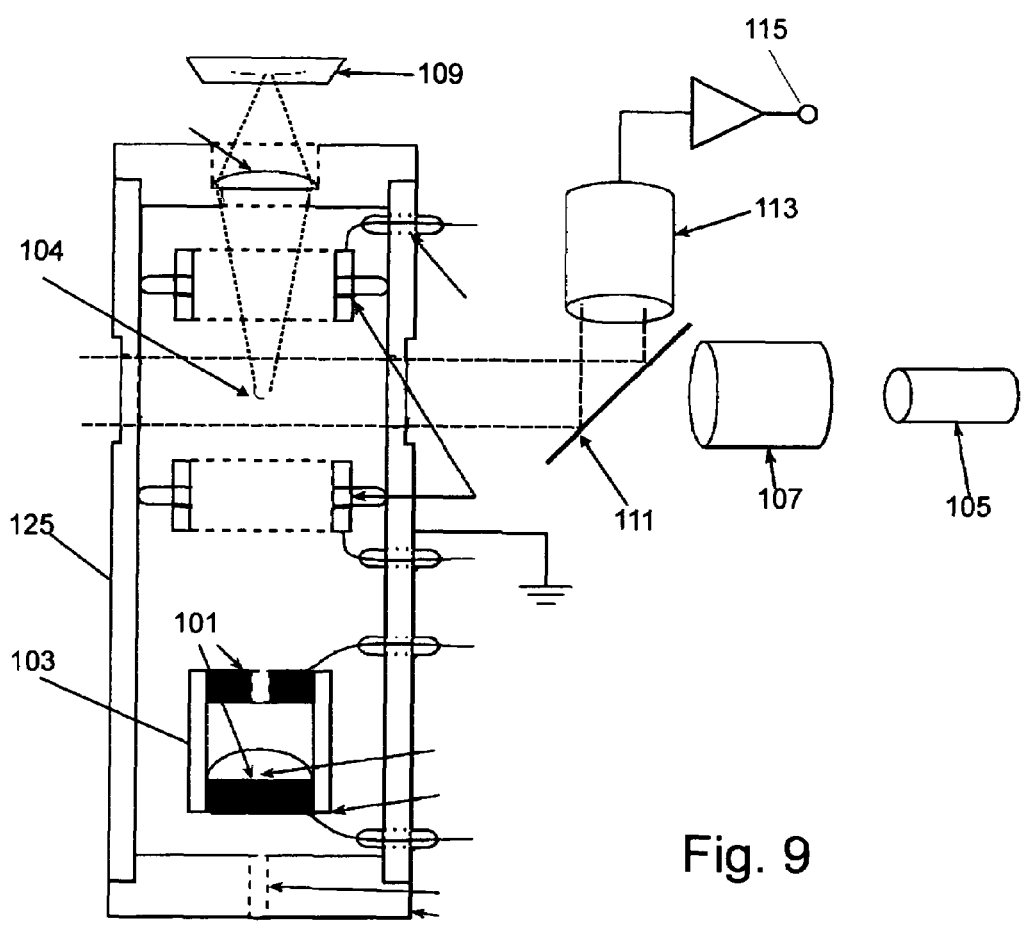
FIG. 9 is a schematic diagram showing an inertial measurement particle trap.

Apparatus for conducting a typical experiment is shown in FIG. 9 and employs a design similar to those employed in early studies of trapped particles. See, for example, WUERKER, R. F., SHELTON, H., AND LANGMUIR, R. V. Electrodynamic containment of charged particles. J. Appl. Phys. 30 (1959), 342-349.

To load the trap, a high-voltage step function is applied between the endcaps 101 of the bulk particle source container 103, projecting inductively charged particles into the center of the trapping region at 104 where their motion is analyzed optically.

A diode laser 105 and associated optics 107 illuminate the trapping volume, which is projected onto a image sensor array at 109. Backscattered light from the trapping volume is mixed with a fraction of the illuminating reference beam by a non-polarizing beam splitter at 111 and directed onto a photodiode detector at 113. The resulting signal may be amplified, filtered, and integrated to provide interferometric readout of the particle's motion at 115.

The actual trap consists of two driven ring electrodes seen at rx121 and rx122 while the grounded cylinder rx125 containing the entire assembly acts as a third, central ring electrode. The trapped particles are glass, metal, or liquid microspheres, anywhere from 0.1 to 100 µm in diameter and charged to a few µC/gm. The active trapping volume is approximately 1 cm$^3$ and trapping voltages are on the order of 500 V to 5 kV, at frequencies from 50 Hz to 5000 Hz. A coherent collimated light source provides illumination for particles to be imaged on a CCD or CMOS camera. It also permits light scattered by particles to be mixed with a reference beam at a detector, allowing interferometric determination of the position at nanometer resolution.

The configuration shown in FIG. 9 permits a great deal of flexibility in the development of experimental protocols. Furthermore, a guiding principle of the experimental plan has been to simplify construction as much as possible, relying on standard fabrication techniques.

Of the many variations on the hyperbolic geometry, the planar trap is most relevant. Its simplified geometry enables lithographic fabrication in micrometer dimensions, either individually or in arrays, and leads to "the possibility of ion-trap and integrated-circuit technology merging with a single chip containing the trap, diode lasers, and associated electronics." See BREWER, R. G., DEVOE, R. G., AND KALLENBACH, R. Planar ion microtraps. Phys. Rev. 46, 11 (December 1992), R6781-R6784.

Figure 7:
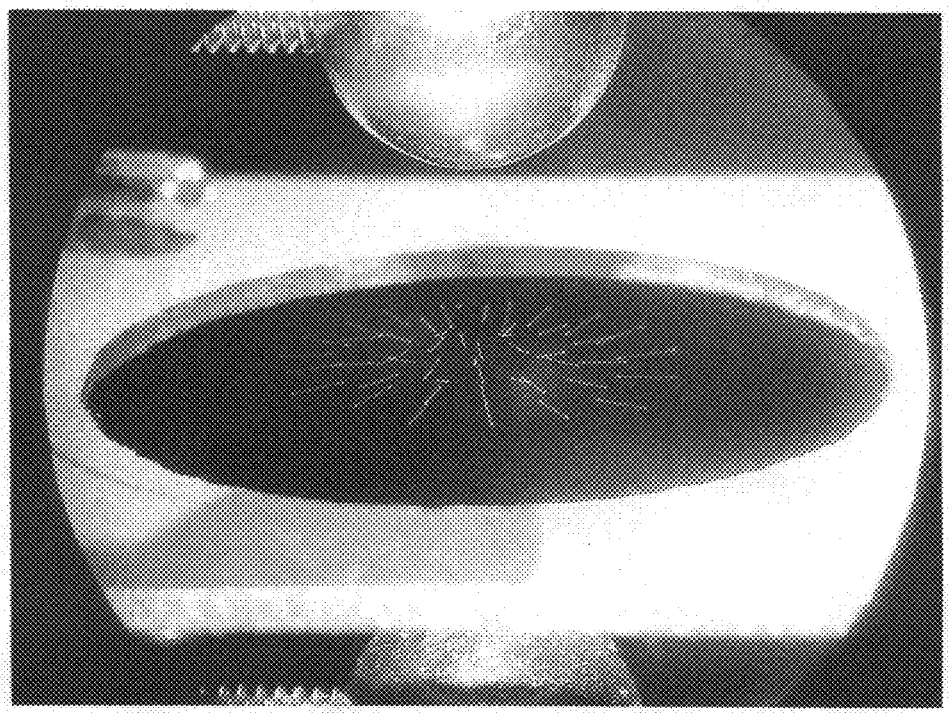
FIG. 7 is a close-up photograph showing a Coulomb crystal of charge particles suspended in the demonstration trap seen in FIG. 6.

In the traps shown in FIGS. 7 and 9, the cylindrical symmetry of the Paul trap has been retained, and in particular the central ring electrode defining the radial trapping plane; however, the endcap electrodes have changed from hyperboloid shells to spherical shells and finally to rings. In the center of the trap, the field geometry is determined less by these particulars and more by the smoothing effect of the Laplacian operator acting upon the axially symmetric boundary conditions.

Developing A Practical Trap

Figure 10:
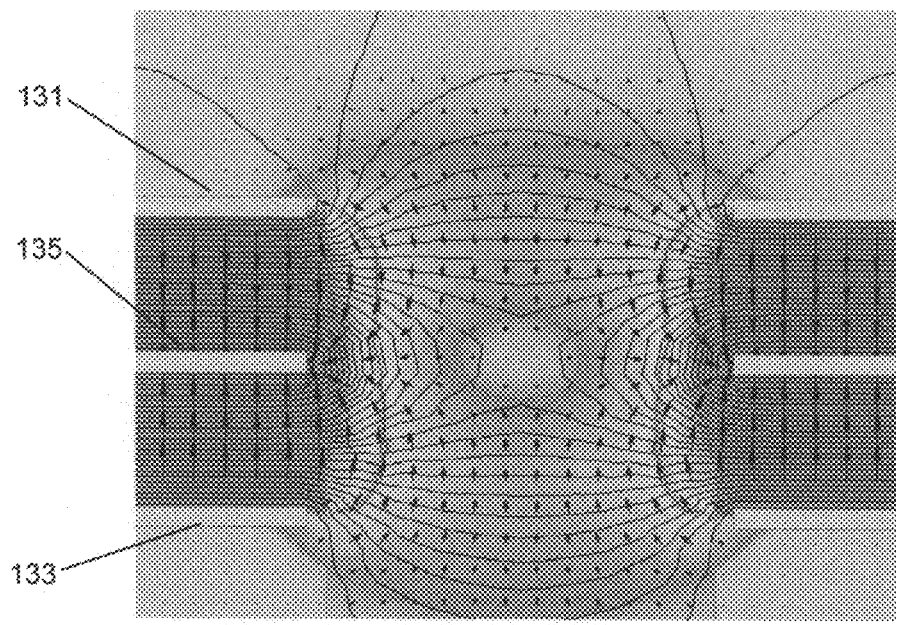
FIG. 10 is a reproduction of a finite-element calculation depicting the field geometry in a three-layer planar particle trap.

FIG. 10 depicts the fields in a three-layer planar trap that has been fabricated as a printed circuit board. The structure is axisymmetric about the vertical centerline. The upper and lower electrodes 131 and 133 are chosen to be the reference, while the central ring electrode 135 is driven with an AC voltage to generate the trapping fields. The electrostatic energy density is at a maximum at the edge of the driven electrode, and falls off to minima at the center and the periphery of the trap. Particles in the intermediate region will experience strong focusing effects that alternately push them towards and away from the center. The net effect is that particles with the correct charge-to-mass ratio e/m will be focused to the central region, just as with the canonical Paul trap. The central isoenergy surfaces in both cases are ellipsoidal, as details of the boundary geometry are smoothed out on the dipole length scale.

In the case where the fields are determined by a central electrode, with a ground reference supplied by a lower plane and a surrounding ring, the field geometry exhibits similar structure in the trap center. FIG. 11 illustrates the situation: note that the isopotentials at 140 form a saddle as before (albeit a warped saddle) but the isoenergy surfaces are clearly no longer closed.

Trap Loading

To demonstrate a working trap with particles of known mass and charge, one must be able to inject particles with known values of these quantities on demand. Since we are working with macroscopic particles with variable mass and geometry and bulk effects, this is not as simple as it may be in the case of ion traps. The literature of aerosol microscopy reveals a number of methods for particle charging and dispersal, but these require the use of conductive liquid media which we would rather avoid.

Ultimately it would be desirable to use proof mass particles with well-known charge and mass at low temperature, e.g., ions of a naturally monoisotopic species (Cs$^+$ comes to mind) forming an optically probed and cooled Wigner crystal.

For the present experiments, however, less exotic proof masses were chosen. Experiments were conducted with µm-scale spheres of borosilicate glass, aluminum, and gold. Gold particles were preferred because of their high density, low reactivity, and high conductivity. All experiments were performed using Au spheres with a mean diameter d=7.25 µm and standard deviation σ=0.58 µm. At a density of 19,300 kg/m$^3$, these particles have an average mass of $3.85 \cdot 10^{-12}$ kg (3.85 ngm).

Figure 12:
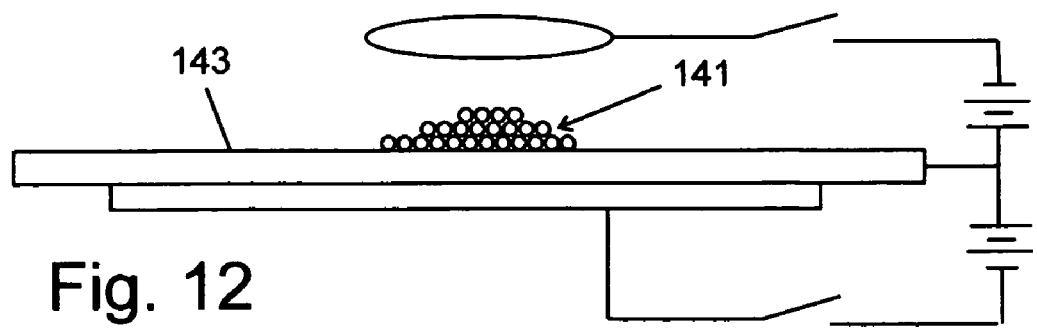
FIGS. 12-15 are schematic drawings showing a piezoelectric trap loading and particle charging system in action.

We solve the problem of charging and loading particles into the trap as shown in FIGS. 12-15. This technique is particularly applicable when the upper induction electrode also serves to generate the trapping field. FIGS. 12-15 illustrate a trap loading and particle charging system in action. FIG. 12 shows a granular bed of Au particles at 141 that adheres to the conducting reference surface of a piezoelectric transducer 143.

Figure 13:
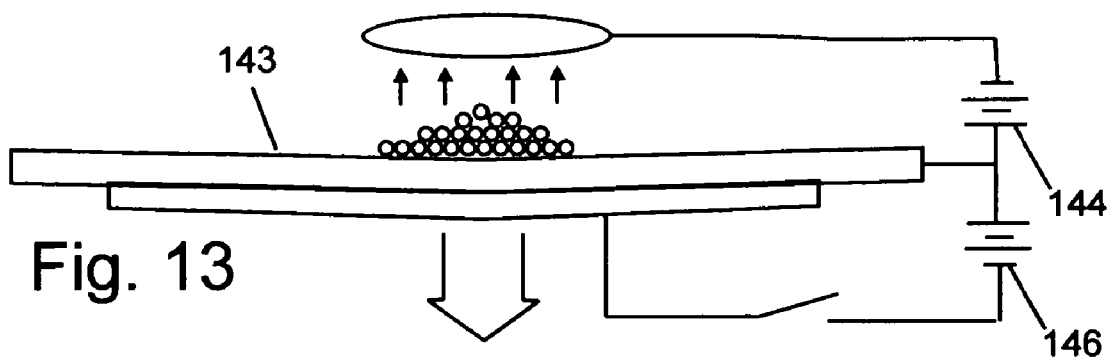

As illustrated in FIG. 13 voltage sources 144 and 146 referenced to this surface are switched on to excite the piezoceramic transducer 143 and to generate an electric field between its surface and the ring electrode 148. Charge redistributes on the conducting surface of the transducer and the adhered granular bed.

Figure 14:
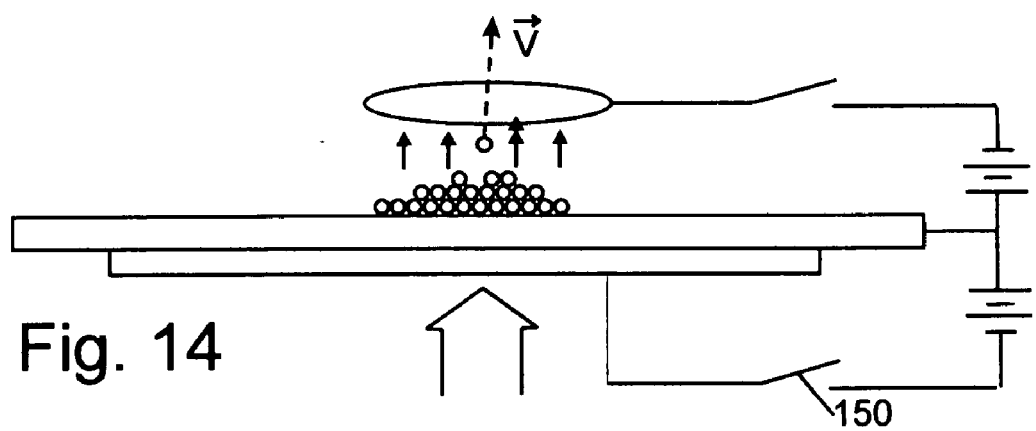

As seen in FIG. 14, when the piezoceramic drive is switched off at 150, the transducer 143 relaxes, and a particle is ejected from the granular bed 143, carrying away charge.

Figure 15:
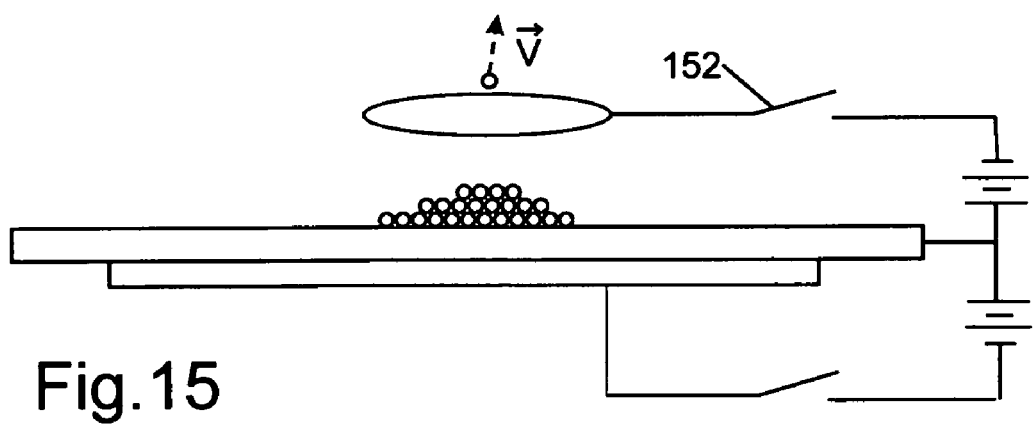

When the induction ring electrode is switched off as shown at 152 in FIG. 15, the particle is allowed to escape from the trap.

Planar Trap Construction

By applying the insights into trap planarization and loading as developed above, a simple trap may be constructed from common materials found in the electronics shop. FIG. 16 details the construction of a half-planar trap with a ring electrode 160 having a 1.0 mm inner diameter, a thickness of 1.3 mm, and a dielectric constant $\epsilon = 4.3\epsilon_0$ from FR4 printed circuit board stock 161 and a common acoustic piezotransducer disk 162. A high-voltage flying lead 166 drives the central electrode while the brass disc of the transducer forms the common ground reference. FIG. 17 shows a close-up of the trap cavity and a centrally located trapped particle.

Finally the entire structure is surrounded by a grounded ring and mounted on a positioning stage as seen in FIG. 18. The ring electrode in the trap 171 is blackened with a permanent marker to enhance image constrast. A bubble level seen at 173 with resolution of 5 arcminutes is used to estimate horizontally, and an LED at 175 provides constant or synchronously strobed illumination for microscopic imaging. The particle launch pulse is applied to the connector at 177, the illumination strobe is applied to the connector at 179, and the A.C. trap voltage is applied to the connector at 181. Positioners at 183 and 185 extend outwardly from the module.

Particle Tracking and Readout

When the particle trap is subjected to acceleration forces, either due to translation or rotation, those forces are manifested in variations in the position or motion of the trapped particles. Translational acceleration causes the center of mass of the particle or particles to be displaced, and also causes an increase in the particle(s) micromotion. Rotational acceleration causes a variation in the orientation of the elliptical orbit(s) occupied by the particle(s), variation in the orientation of assymetrical particle(s), and/or variation in the relative location of different particles. A variety of different readout sensors may be employed to detect these variations in particle position or motion as described below.

Our sensor requires a readout of particle motion to permit determination of acceleration. Although the classic technique of ion trap mass spectroscopy employs resonant absorption of radiofrequency energy to determine trap loading, this is too coarse a measure for our requirements. (See DEHMELT, H. G. Radiofrequency spectroscopy of stored ions I: Storage. In Advances in Atonic and Molecular Physics, Bates and Estermann, Eds., vol. 3. Academic Press, New York, 1967, pp. 53-72; and DEHMELT, H. G. Radiofrequency spectroscopy of stored ions II: Spectroscopy. In Advances in Atonic and Molecular Physics, Bates and Estermann, Eds., vol. 5. Academic Press, New York, 1969, pp. 109-154.

We require knowledge of the particle's position and breadth of motion from cycle to cycle of the trapping frequency. Capacitive particle position readout techniques may be applied, but must be capable of distinguishing small capacitive variations (on the order of $10^{-12}F$) in a large background field (100V to 1000V).

Optical readout techniques are more accessible and couple minimally to the large trapping field. Optical levers have been employed in many sensitive experiments, and have been shown to give resolution to 10 nm or better (see VISSCHER, K., GROSS, S. P., AND BLOCK, S. M. Construction of multiple-beam optical traps with nanometer-resolution position sensing. IEEE Journal of Selected Topics in Quantum Electronics 2, 4 (December 1996), 1066-1076), while interferometric techniques can typically resolve motion to 1 nm or better as described by YARIV, A in Optical Electronics, 4th ed. Saunders College Pub., Philadelphia, 1991. However, optical levers are typically employed when the motion of interest is small, while interferometry is typically limited to scattering apertures incommensurate with the probe wavelength.

Since our present experimental techniques are performed without a closed control loop, large excursions are expected and the use of optical leverage becomes more complicated. As the particles of interest are spheres a few microns in diameter, their coherent scattering profiles significantly complicate the interpretation of interference fringes to determine position (See GOODMAN, J. W. Introduction to Fourier Optics. McGraw-Hill Science/Engineering/Math, 1996).

By relaxing the temporal and spatial resolution requirements, we can choose to employ video microscopy particle tracking, which is typically capable of locating submicron (>200 nm) spheres to within 10 nm in the focal plane and 150 nm in depth (See CROCKER, J., AND GRIER, D. Methods of digital video microscopy for colloidal studies. Journal of Colloidal Interface Science 179 (1996), 298-310).

When information from individual images are combined into time series of single-particle trajectories it becomes possible to measure rheological parameters such as diffusion coefficients and pair-wise interaction potentials (See GARDEL, M. L., VALENTINE, M. T., AND WEITZ, D. A. Microrheology. In Microscale Diagnostic Techniques, K. Breuer, Ed. Springer Verlag, 2002).

Figure 19:
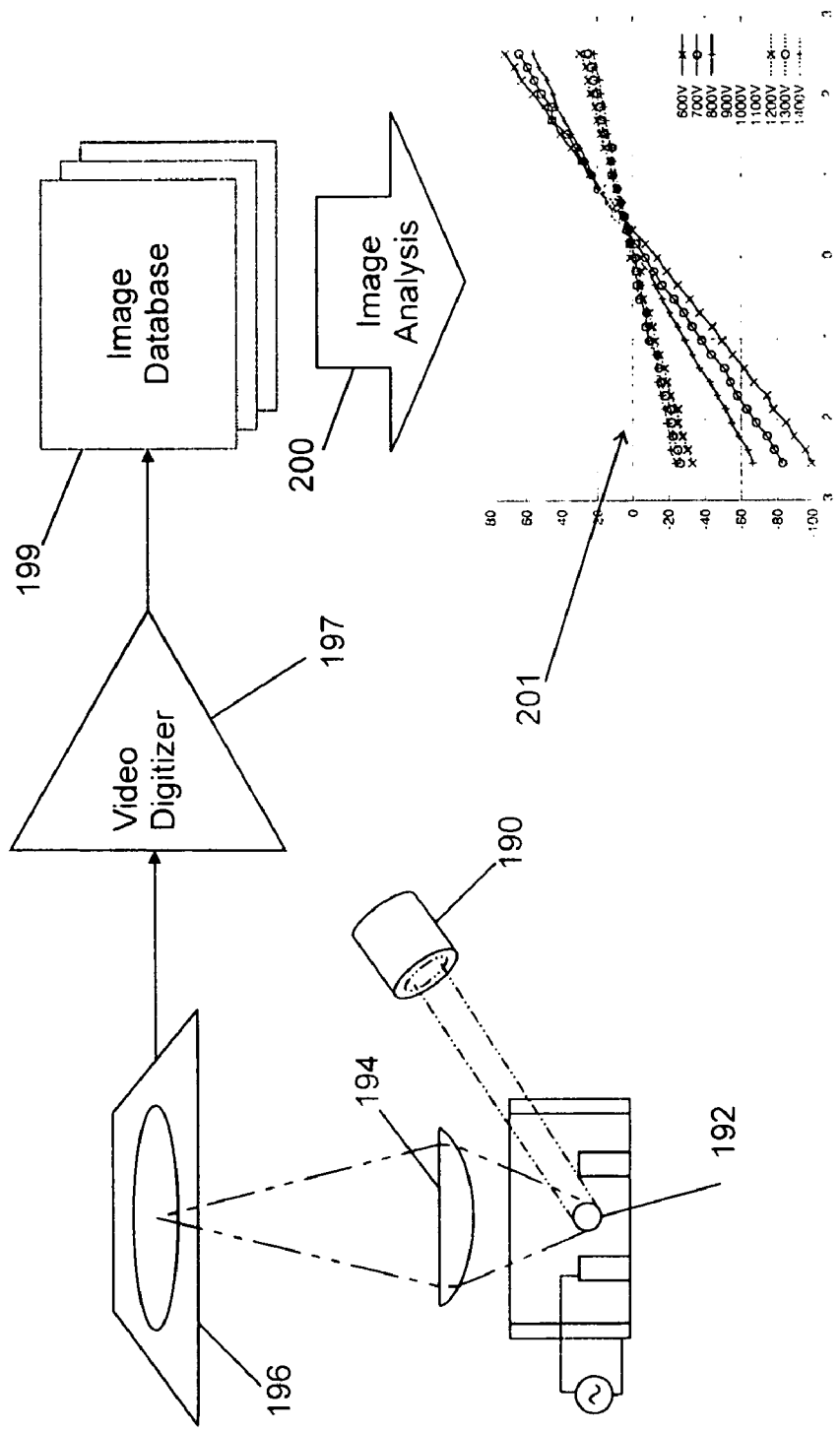
FIG. 19 is a schematic diagram of an experimental configuration for characterization by video microscopy.

Putting these details together we arrive at the experimental configuration shown in FIG. 19. An LED strobe 190 illuminates the trap center at 192, and particles therein are imaged by a microscope objective 194 directly onto a CCD imaging array 196. The video signal is digitized at 197 into individually tagged frames that together constitute a database 199. This database is then processed offline at 200 to recover particle motion and other variables of interest as indicated at 201.

Figure 20:
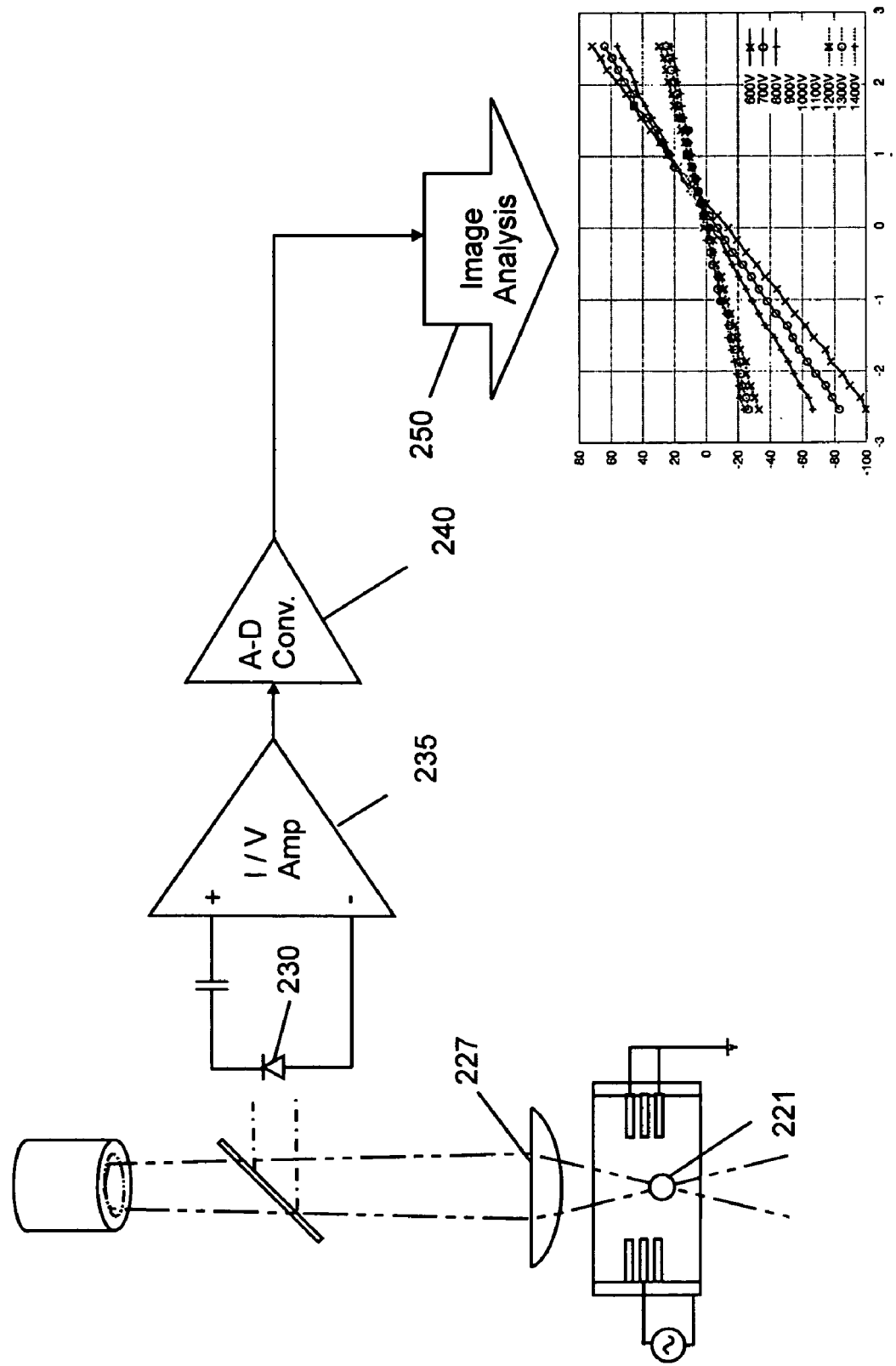
FIG. 20 is a schematic diagram of an experimental configuration for measuring spectral noise density.
Figure 21:
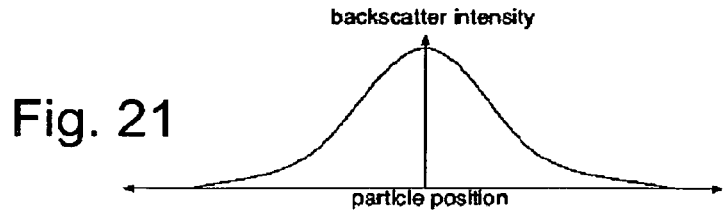
FIGS. 21-24 are diagrams depicting the measurement of the intensity of light scattered by a particle as it moves through the waist formed by the focused beam in the configuration of FIG. 20.

While this is a simple yet versatile system for trap characterization, readout bandwidth will be limited by the video frame rate to a fraction of the trapping frequency. FIG. 20 shows an alternate configuration that may be used to measure small variations in particle position by a technique we propose as a variation on the optical lever.

In this configuration we measure the intensity of light scattered by a particle 221 as it moves through the waist formed by a focused beam from the lens 227. The backscattered light is detected by the photodiode 230 whose output is amplified at 235 and digitized at 240, and the resulting data is analyzed at 250. This readout allows us to probe the spectral characteristics of trapped particle motion, and may be calibrated to provide an estimate of the scale of these effects.

Figure 22:
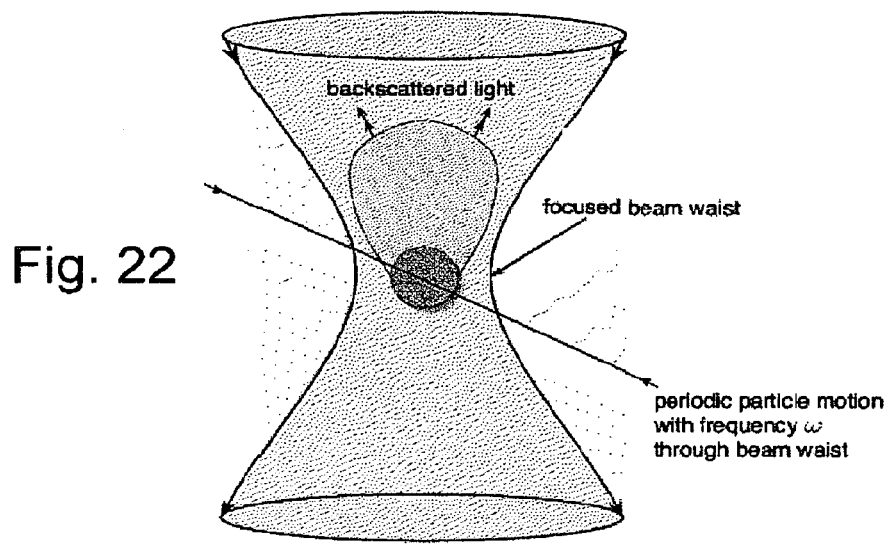

FIGS. 21-24 show a plan detail of the beam waist readout. As a particle moves through the waist of a focused beam of light as seen in FIG. 22, it scatters light back into the focal cone. The observed backscatter depends on the intensity profile of the beam (e.g., a diffraction-limited Gaussian), the scattering form factor of the particle, and the position of the particle as it moves through the beam as graphically depicted in FIG. 21.

Figure 23:
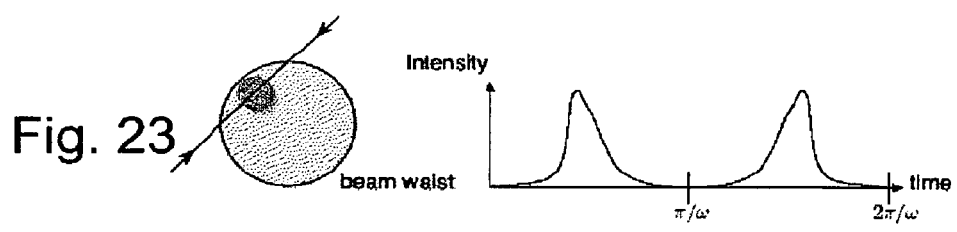
Figure 24:
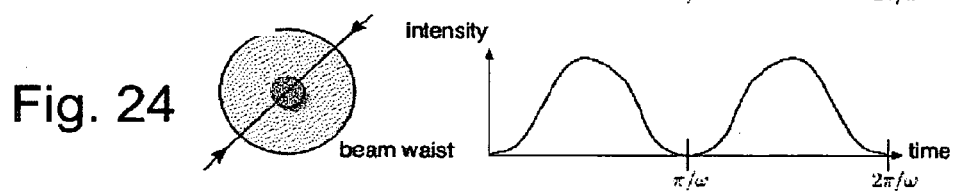

If we assume that the particle's motion is harmonic, then the time-domain intensity profile will appear as a symmetric positive function as shown in FIGS. 23 and 24. It is apparent that the intensity profile will depend on the center of motion, and as the center of motion moves toward the center of the beam we expect the intensity profile to widen or increase its duty cycle as illustrated in FIGS. 23 and 24 for motion that is off center and centered respectively in the beam waist. Unfortunately, this effect will be complicated by motion parallel to the beam axis, so we consider it to be a rough diagnostic suitable for the measurement of small motions.

A quadrant photodiode may be used as shown in FIG. 37 to obtain data on the motion of the particle in the waist of a focused beam along orthogonal x and y axis.

Results

Our goal is to characterize the trap's response to acceleration. In the case of video microscopy, readout is performed by determining the particle's motion parameters from images of its activity in the trap. Center of motion was chosen as the readout statistic, but amplitude of micromotion could also be used.

Figure 25:
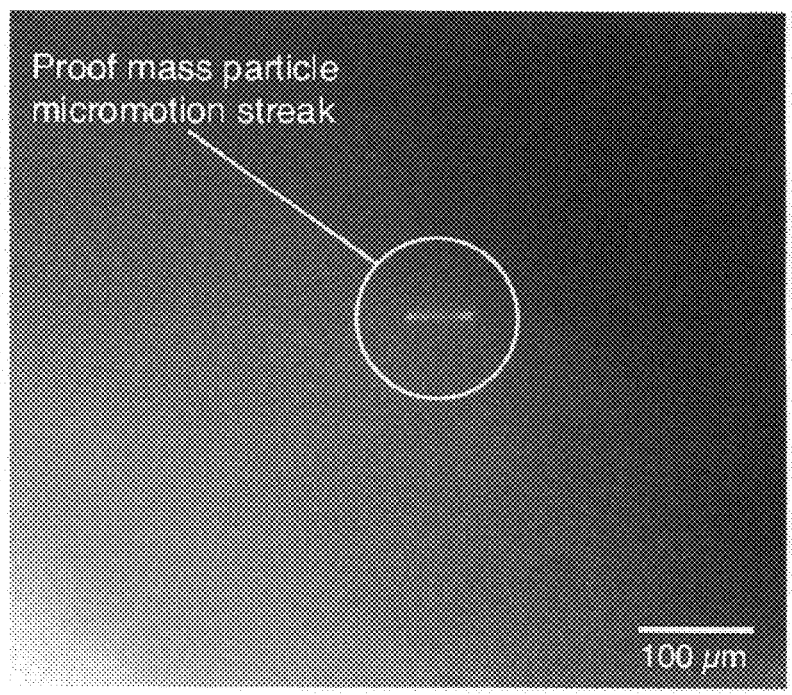
FIG. 25 is a photograph showing the image of a proof mass particle micromotion streak from a video microscope.

A typical image of a single particle suspended in a trap is shown in FIG. 25, with a particle suspended in the center of a 1 mm trapping cavity. In the image's corners the surface of the driven electrode is visible. While the particle is spherical with a nominal 7.25 μm diameter, it appears as a streak in this image due to micromotion.

The spot function of the particle image is taken to be Gaussian as it moves harmonically in the seudopotential. The cycle average of s(x) (the pixel value at position x in the image) has the form:

$$\langle S_\sigma, A, \omega, x_0(x) \rangle = \frac{1}{\sqrt{2\pi}\sigma} \int_0^{2\pi/\omega} e^{-\frac{1}{2\sigma}[(x-x_0)-A\cos\omega t]^2} dt$$

where σ is the width of the particle's spot function and A, ω, $x_0$ are the particle's micromotion amplitude, frequency and center of motion respectively.

When numerically evaluated, this averaged spot function closely corresponds to the observed image intensity. However, the lack of a closed-form solution for this integral and the computational expense of its evaluation leads us to restrict attention to the center of motion statistic, which is determined quite simply as the first moment of the pixel intensity.

Readout bandwidth is fundamentally limited by the trapping frequency (in this work, typically 100 Hz to 10 kHz) because the pseudopotential is an average effect. In the case of video microscopy, readout is also band-limited by the video frame rate (here 30 Hz). We must be mindful of the effects of frequency aliasing in readout of particle motion, but as the particle is strongly damped (i.e., it has a low Reynolds number) these effects are expected to be more pronounced with respect to the frame frequency than the trap frequency.

Here, we will restrict the use of video characterization to low-frequency effects (e.g., static acceleration response) and use the alternate readout method of beam waist intersection to study response over larger bandwidths.

Calibration

While it is not possible to determine the trap calibration a priori because of uncertainties in charge and mass (as well as geometric correction factors), the trap may be calibrated by applying known accelerations and measuring the response in terms of displacement of particle center of motion. This procedure may be repeated as trap parameters vary, allowing one to probe the tunability of trap response.

Figure 26:
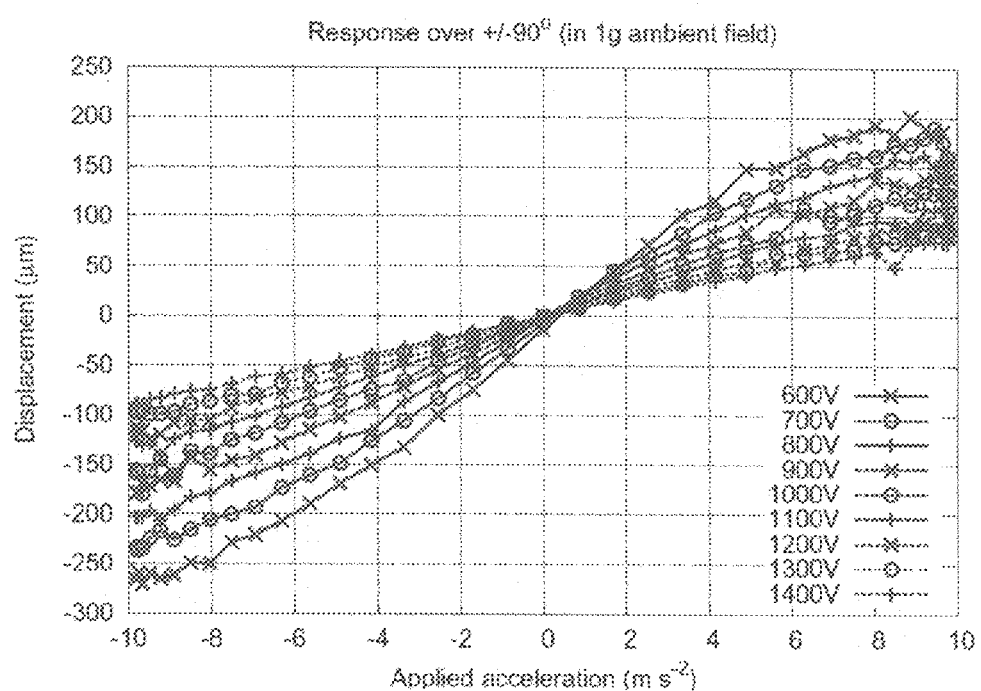
FIG. 26 is a graph showing the results of calibrating the trap as applied acceleration varies.

FIG. 26 shows the results of calibrating the trap as applied lateral acceleration varies from −1 g to +1 g. The trapping voltage was also varied, and as one would expect the response in displacement is greater for weaker trapping fields. Less expected is the apparent linearity of response over a fairly large central region of the trap.

Figure 27:
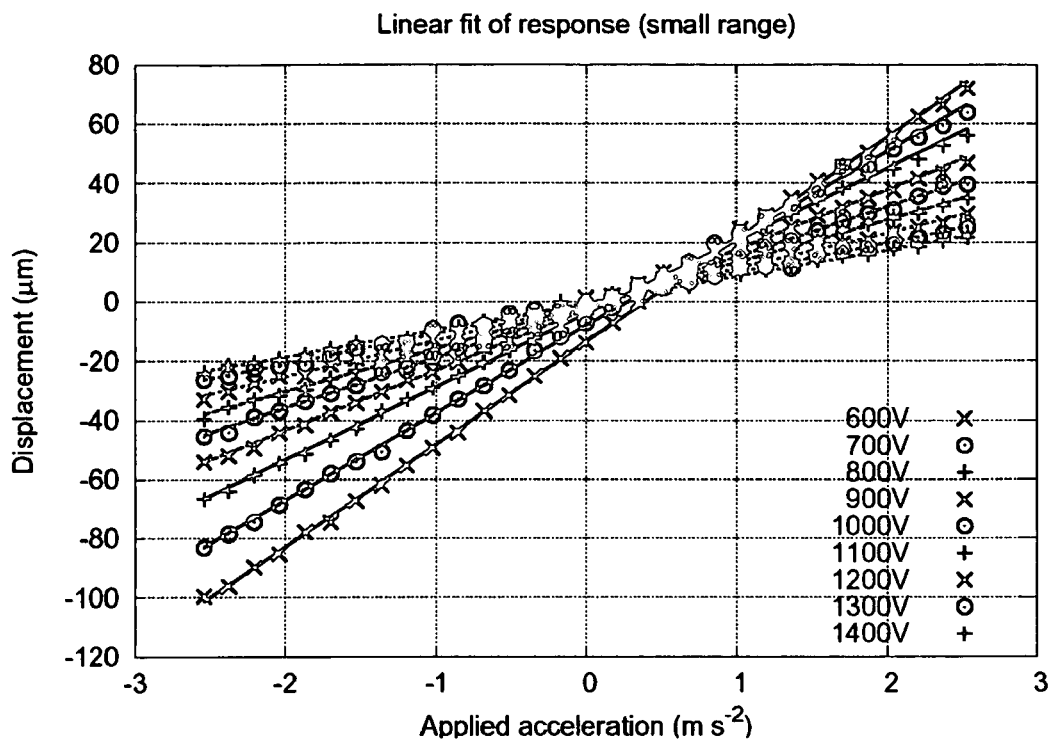
FIG. 27 is a graph showing the calibration curve in its central linear region.
Figure 28:
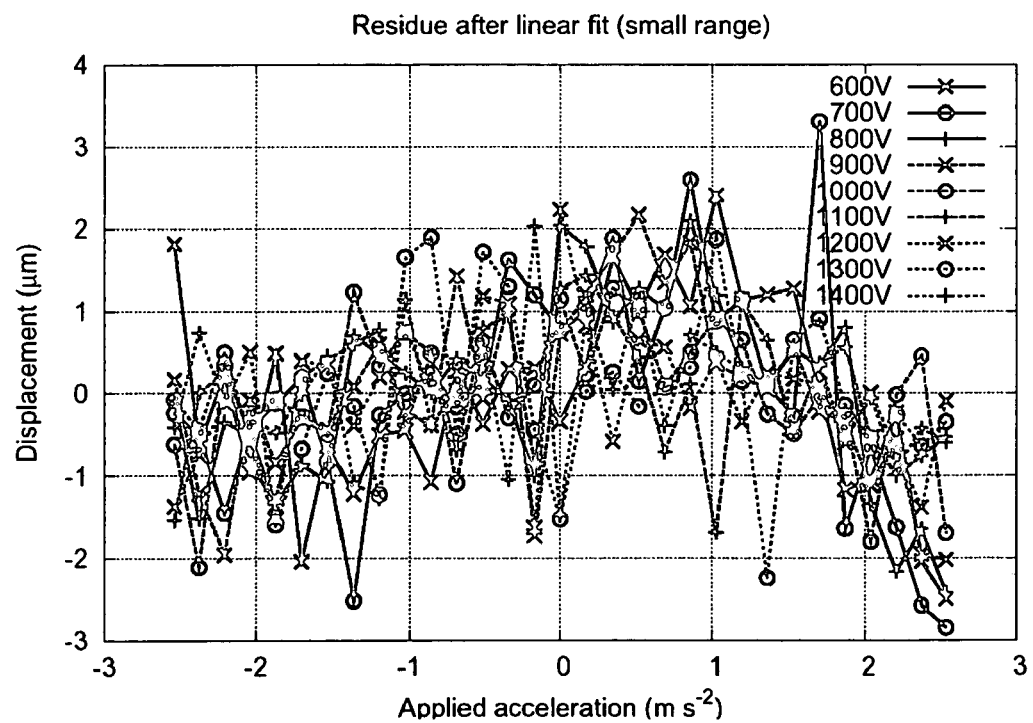
FIG. 28 is a graph showing the residual error after the application of the linear fit of FIG. 27.

FIG. 27 shows results that concentrating on the central linear region. Data points are plotted and a linear fit is drawn for each set. A good fit is observed, but to quantify this we plot the residual error of the fit in FIG. 28.

Tunability

A unique feature of the inertial mode trap is its dynamic tunability or dependence of effective spring constant $K = e^2 V^2 / m\omega_0^2 a_0^4$ on trap voltage and frequency. When the trap's linearized response is plotted against the trap voltage, the expected quadratic characteristic emerges. The sensitivity of the accelerometer may accordingly be adjusted by varying either the amplitude or the frequency of the applied trap voltage.

Figure 29:
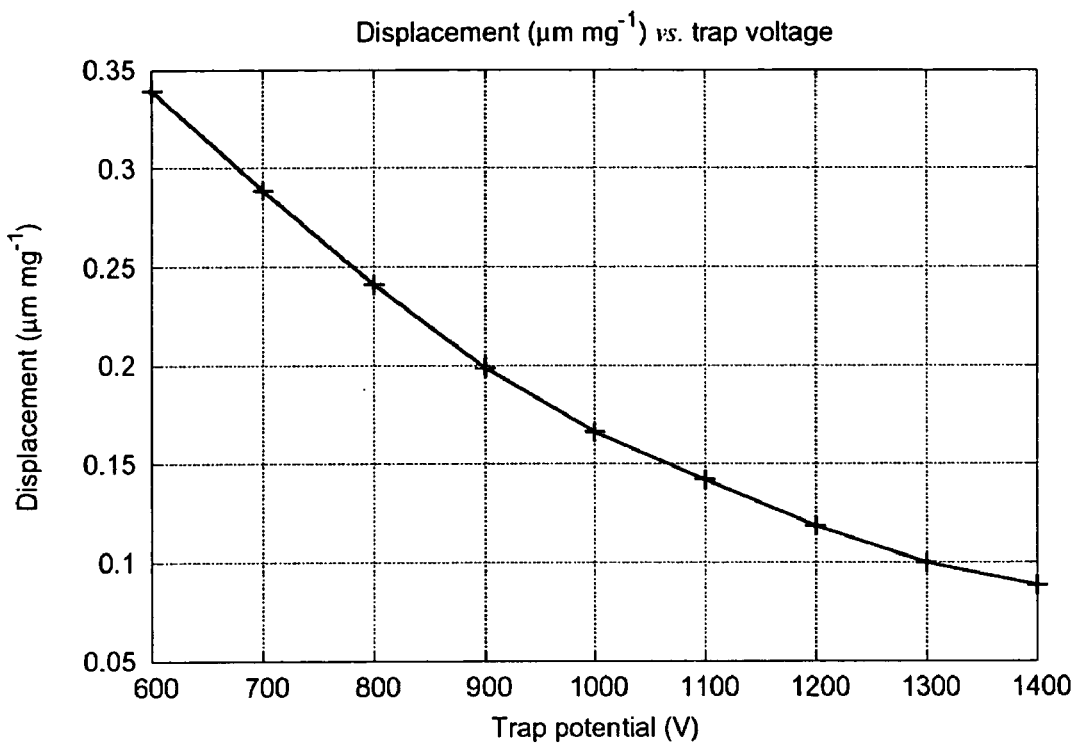
FIG. 29 is a graph of the trap's linear response plotted vs. trap voltage.
Figure 30:
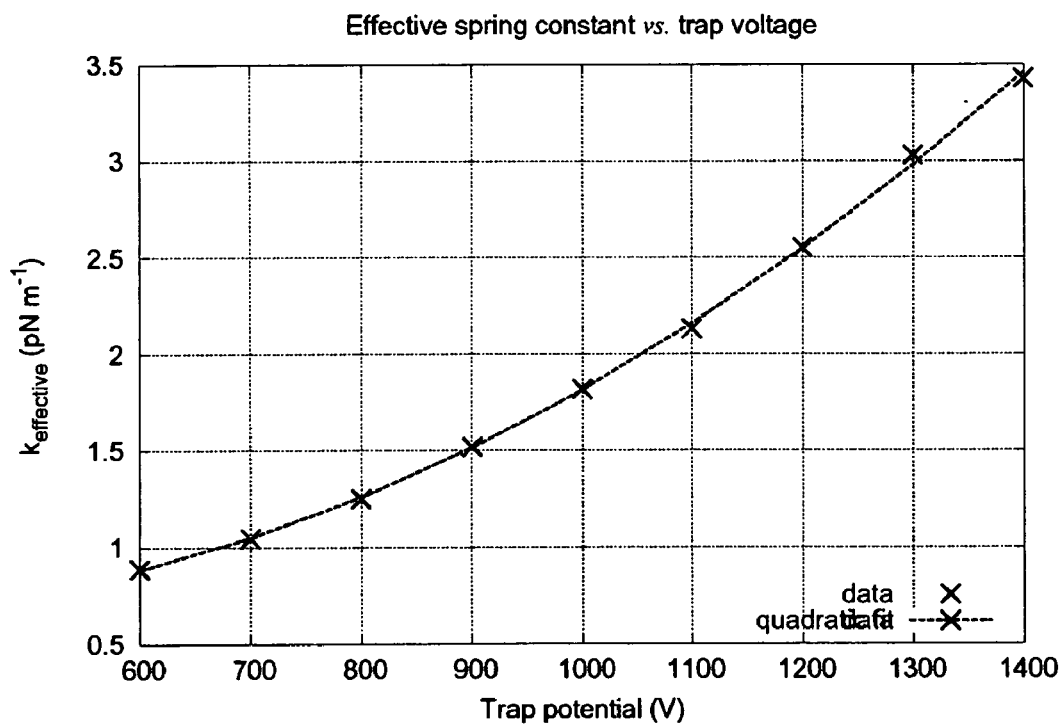
FIG. 30 is a graph of the effective spring constant of the trap plotted vs. trap voltage.

This relationship is suggested by the 1/K dependence seen in FIG. 29 and evidenced by a close quadratic fit of the measured effective spring constant, as shown in FIG. 30. Here we have used the small-angle linearization (FIG. 27) on the assumption that practical sensors will be operated in the linear region with closed-loop control.

The sensitivity of the accelerometer may accordingly be adjusted by varying either the amplitude or the frequency of the applied trap voltage.

Drift

Long term variations in readout bias may also be observed by processing a time series of images. After data sets were collected for the above characterizations, the trap voltage was set to a midrange value of 1.0 kV and the trap rotated to an angle of 45°, corresponding to an acceleration bias of 0.707 g.

Figure 31:
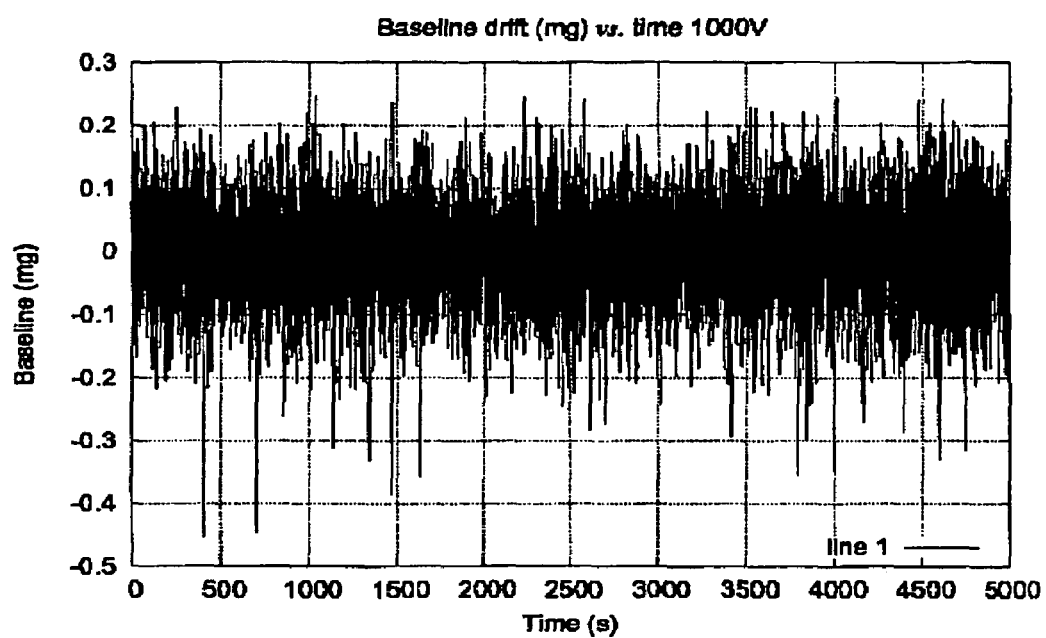
FIG. 31 is a graph showing baseline drift vs. time.

Images of the particle were captured for 5000 seconds at a rate of 2 frames per second and the particle motion was determined through the same image processing chain as above. Variations in the center of motion were then plotted according to the above calibrations. FIG. 31 shows the results of this measurement.

The power spectral density of this measurement is flat up to 1 Hz (half the sampling frequency), suggesting that the measurement error exceeds the trap's intrinsic physical noise from sources such as Brownian motion or fluctuation-dissipation.

Noise Power Spectral Density

Figure 32:
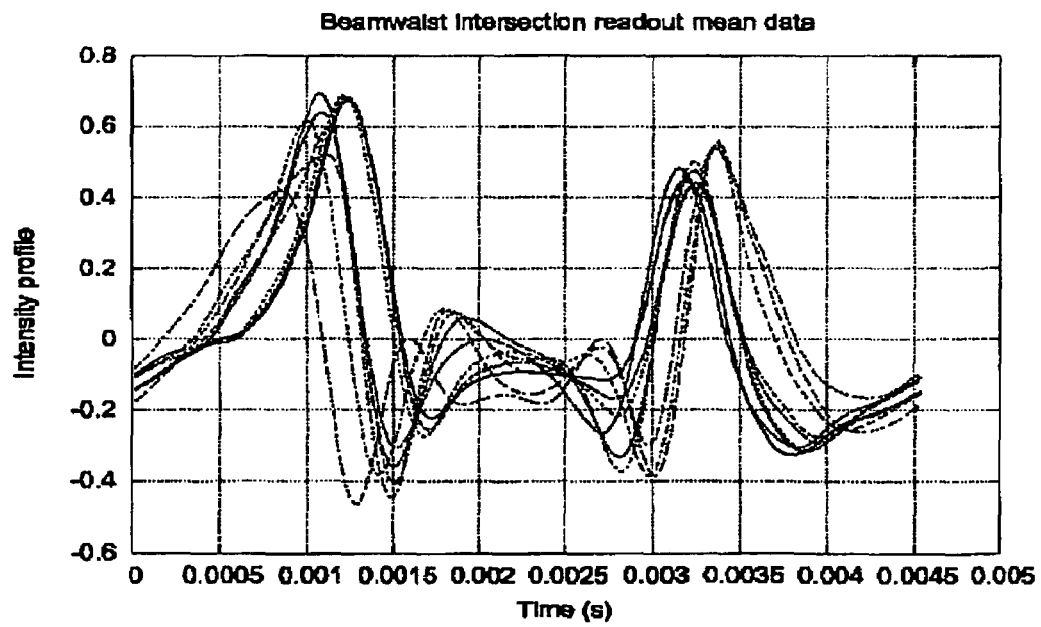
FIG. 32 is a graph showing time domain profiles of scattering intensity using a waist intersection readout.

To probe the noise structure intrinsic to our accelerometer, we turn to an alternate experimental configuration utilizing readout of the beam waist intersection. This measurement was calibrated by applying known small accelerations and recording long time series of scattering intensity. Typical time-domain profiles of scattering intensity are shown in FIG. 32.

Here, the trap operated at 1.1 kV and 220.5 Hz, and the curves shown each correspond to a different applied acceleration. Each curve is the mean profile obtained by phase-coherent averaging of 25,000 samples. As we showed before, one might expect the observed widening of these profiles to correspond to an increased intersection of the particle with the beam waist.

Figure 33:
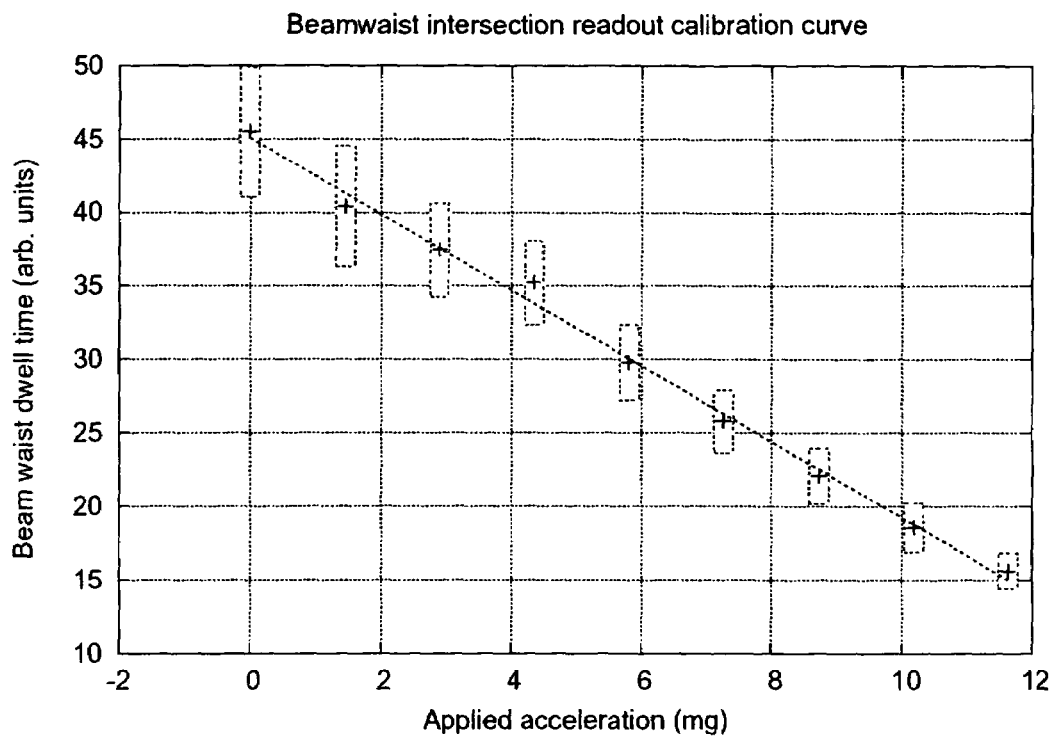
FIG. 33 is a graph of the beam waist dwell time against applied acceleration.

This widening can be recovered by taking as a statistic the (centered) second moment of the intensity profile. We call the square root of the second moment the beam waist dwell time and plot this against applied acceleration in FIG. 33 as a calibration curve. Over the small range of variations involved (approximately 10 mg) we are rewarded by observing a reasonably linear response.

Because this measurement compresses several degrees of motional freedom into one and the beam waist geometry is not well-known, it is difficult to estimate the absolute scale of these measurements. We can however reasonably conclude from this calibration curve that there are no strong nonlinearities lurking in our measurement, and begin to consider features of the noise spectral power density if not its absolute scale.

Figure 34:
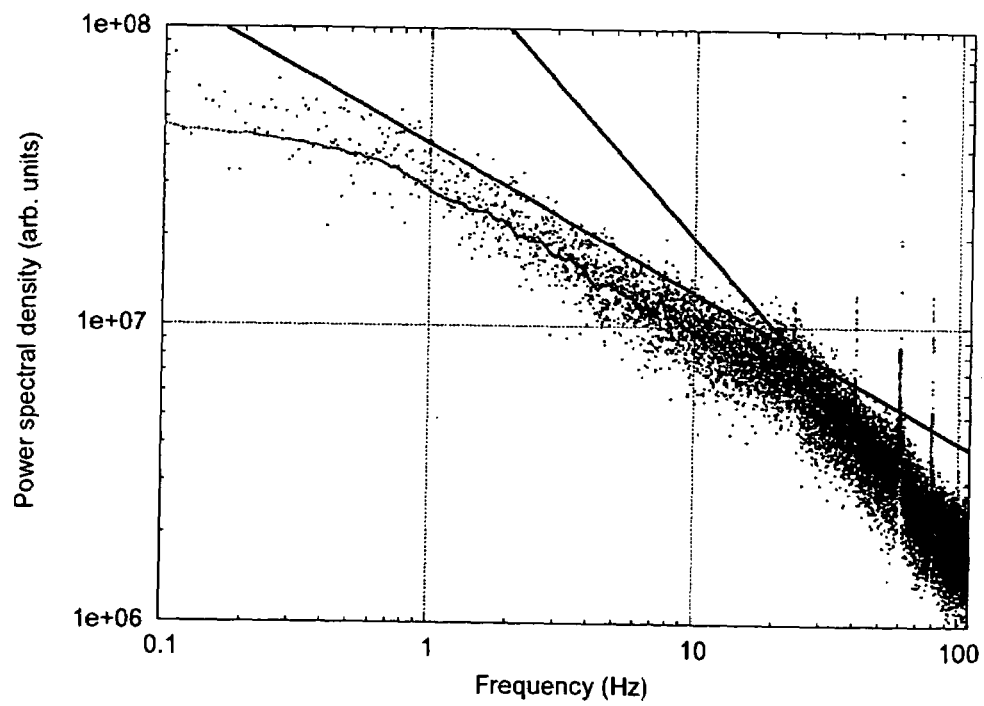
FIG. 34 is a graph of the power spectral density vs. frequency.

FIG. 34 shows the power spectral density of the same data used to obtain the calibration curve. Dots are plotted for individual points in the density along with a moving average of 50 points to accentuate features in the density. A peak at 23.7 Hz coincides with an apparent shift in the noise density trend from f-112 to f-I (solid lines). A very strong peak appears at 60 Hz as one might expect, but peaks also appear at 43.5 Hz, 80.0 Hz, and 100 Hz. The graph cuts off at 110.25 Hz, half the trapping frequency.

Summary of Developmetn Work

The development work described above has demonstrated the theory and practice of inertial measurement using an electrodynamically levitated proof mass. By adding inertial terms to the Paul trap dynamics, we have derived classical observables have that depend on the local acceleration field.

In addition, we have also confirmed that these observables appear in practice, in what we believe to be the first electrodynamic trap accelerometer. An important (and unusual) aspect of our accelerometer is its dynamic tunability: its effective spring constant depends on the trap drive parameters. Our roughly constructed trap exhibits a large region of linear response to acceleration and we have presented evidence to suggest that the total noise power in typical operation of the trap lies below a readout noise floor of −0.2 mg.

The metrology may also be simplified. Two leading candidates are self-mixing laser diode velocimetry (SMLDV) and differential optical leverage. SMLDV is described by KAWAI, R., ASAKAWA, Y., AND OTSUKA, K. in Ultraigh-sensitivity self-mixing laser doppler velocimetry with laser-diode-pumped microchip LiNdP4012 lasers. IEEE Photonics Tech. Lett. 11, 6 (June 1999), 706-708; and by SHIBATO, T., SHINOHARA, S., IKEDA, H., YOSHIDA, H., SAWAKI, T., AND SUMI, M. in Laser speckle velocimeter using self-mixing laser diode. IEEE Trans. on Inst. and Meas. 45, 2 (April 1996), 499-504. SMLDV might be accomplished simply by mounting a laser diode sufficiently close to the trap that scattering from the particle influences mode selection in the laser diode as described by LANG, R., AND KOBAYASHI, K. External optical feedback effects on semiconductor injection laser properties. IEEE Journal of Quantum Electronics QE-16, 3 (March 1980), 347-355. In other words, the particle effectively becomes a mirror defining a Fabry-Perot cavity external to the laser diode package.

Differential optical leverage is described by VISSCHER, K., GROSS, S. P., AND BLOCK, S. M. Construction of multiple-beam optical traps with nanometer-resolution position sensing. IEEE Journal of Selected Topics in Quantum Electronics 2, 4 (December 1996), 1066-1076.

Most laser diodes are packaged with a photodiode used for optical feedback mode locking; the signal from this photodiode may also be used to observe laser intensity variations (due to the action of the external cavity) analogous to the interference fringes that occur in a Michelson interferometer as describe by MICHELSON, A. A. in Studies in optics. University of Chicago Press, 1962.

By placing several SMLDV sensors to track a particle along non-parallel axes, we might expect to recover the particle's three-dimensional motion by triangulation or orthogonalization of the combined interferometric signals.

We have observed Coulomb crystals in small traps and in large traps as described by ROBERTSON, S., AND YOUNGER, R. in Coulomb crystals of oil droplets. American Journal of Physics 67, 4 (April 1999), 310-315.

Figure 35:
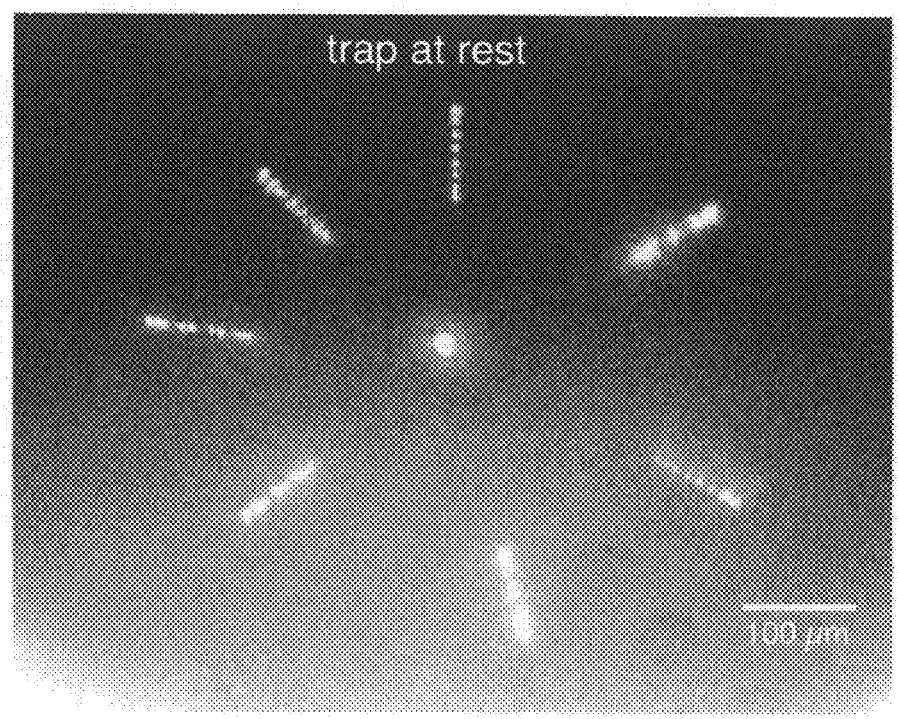
FIGS. 35 and 36 are two photographs of a trapped Coulomb crystal of gold particles at rest and subjected to harmonic acceleration respectively.
Figure 36:
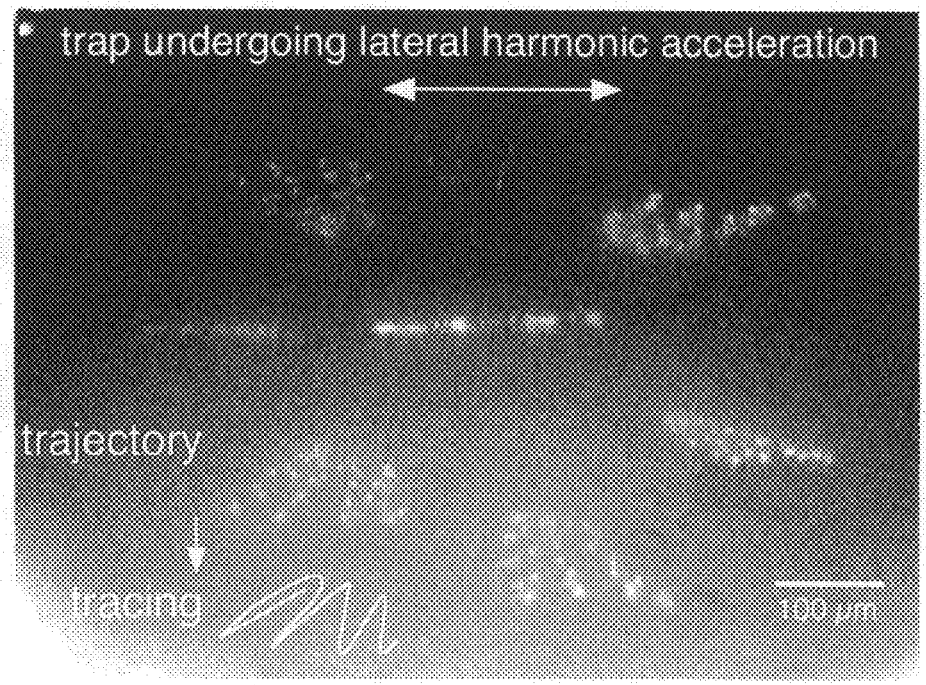

In FIGS. 35 and 36 we demonstrate the lateral inertial excitation of a Coulomb crystal. Trajectories appear discrete because particles are stroboscopically illuminated. FIG. 35 shows the trap at rest and FIG. 25 shows the trap undergoing lateral harmonic acceleration. One of these trajectories has been manually traced in FIG. 36 to clarify its form. This trajectory—essentially a 3-dimensional Lissajous pattern—holds a wealth of information about the trapping fields, the applied acceleration, and the timing of these events. This information may be extracted from the system with simplified metrological techniques.

We also observe that these harmonically accelerated crystals are stable for tens of hours. The crystal shown above, for example, remained stable under this applied excitation for over 30 hours, at which point the experiment was interrupted.

Interestingly enough, this crystal maintained its orientation in the trap throughout the experiment, although we expected to observe some net rotational drift by the end. Several reasons for this effective angular restoring force come to mind: trap electrode asymmetry might have been sufficient to strongly define a preferred orientation; charge accumulation on the trap might also play a role; or perhaps it is strong viscous damping due to the atmosphere in the I mm$^3$ trap cell. We are working to determine the cause of this orientation to allow us to either a) free the crystal to rotate or b) better understand the effective torque keeping the crystal oriented in order to fully quantify measurement of rotation.

Our trap loading mechanism points to a wealth of follow-on work. Particle mass and charge are not well-known with the current loading protocol, but could be better determined by using the trap in a spectroscopic mode to determine the particle's e/m ratio [35]. If massive (micron-scale) particles are to be used they must be stored when the trap is not operating, in such a way as to maintain their integrity.

One might even consider the use of crystallized plasmas as proof masses. Such structures are described by TAN, J. N., BOLLINGER, J. J., JELENKOVIC, B., AND WINELAND, D. J. in Long-range order in laser-cooled, atomic-ion Wigner crystals observed by Bragg scattering. Phys. Rev. Lett. 75 (1995), 4198-4201, and are amenable to sensitive optical probes such as Bragg scattering [16] to determine lattice parameters and also exhibit rigid body dynamics.

Simplified optical metrology has been mentioned, but we might even consider using the beam waist intersection readout to measure small motions in a trap operating under closed-loop control. Such a trap might have a more versatile electrode geometry (see KIELPINSKI, D., MONROE, C., AND WINELAND, D. J. Architecture for a large-scale ion-trap quantum computer. Nature 417 (June 2002), 709-711) than those used in the present work to permit force balancing or the current trap might be operated in a mode where the spring constant is continuously retuned to keep the proof mass in a small measurement zone.

Finally, there is the matter of agile high-voltage control. In the course of this work we have pushed our operating voltages from 6 kV down to 600 V (and as low as 200 V in some cases not documented here). While it is important to identify ways to push the operating voltage lower still, we must also develop or identify a means to drive small capacitive loads with good phase control at frequencies from 50 Hz to 5 kHz and voltages up to 1 kV. Ideally, this high-voltage signal generator could be controlled by a microprocessor and fit within a total volume of 1 cm$^3$ or less.

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. An inertial sensor comprising an electrodynamic trap for suspending one or more charged particles and a readout device for measuring the inertial forces to which said trap is being subjected by measuring variations in the position or motion of said one or more charged particles when said electrodynamic trap is subjected to acceleration and when said one or more charged particles are subjected to electrodynamic forces applied by said electrodynamic trap, said electrodynamic trap comprising a ring electrode and at least one additional electrode spaced from the plane containing said ring electrode and aligned with the axis of said ring electrode, and a power source for applying an oscillatory electrical potential between said ring electrode and said at least one additional electrode to create a quadrupole field that elastically constrains said one or more charged particles to a specific location between said electrodes by a substantially linear restoring force.

2. An inertial sensor as set forth in claim 1 wherein said readout device comprises a light source directed at said one or more charged particles and means for measuring the spectral characteristics of the variations in the intensity of light scattered by said one or more of charged particles.

3. An inertial sensor as set forth in claim 2 wherein said light source includes focusing means for concentrating light on said one or more charged particles.

4. An inertial sensor as set forth in claim 1 wherein said readout device measures variations in the position or motion of said one or more charged particles by optical interferometry.

5. An inertial sensor as set forth in claim 1 wherein said readout device measures variations in the position or motion of said one or more charged particles by optical leverage.

6. An inertial sensor as set forth in claim 1 wherein said one or more particles are suspended within an electric field and wherein said readout device measures variations in the position or motion of said one or more charged particles by detecting changes in said field.

7. An inertial sensor as set forth in claim 6 wherein said changes in said field result from field absorption by said one or more charged particles.

8. An inertial sensor comprising an electrodynamic trap for suspending one or more particles and a readout device for measuring variations in the position or motion of said one or more charged particles when said electrodynamic trap is subjected to acceleration wherein said readout device measures variations in the position or motion of said one or more charged particles by producing data representing an image of said particles and processing said image data.

9. An inertial sensor as set forth in claim 8 wherein said readout device comprises a source of illumination directed toward said one or more charged particles, means for projecting an image of said particles as illuminated on an image sensing array to produce said data representing said image, means for digitizing said data, and a data processor for processing said image data to produce output data indicative of a measure of said acceleration.

10. An inertial sensor as set forth in claim 8 wherein the motion of said one or more charged particles is manifested in said image as one or more corresponding streaks.

11. An inertial sensor as set forth in claim 8 wherein said readout device includes means directing stroboscopic illumination onto said one or more charged particles to obtain image data providing timed position information on said one or more charged particles.

12. An inertial sensor as set forth in claim 8 wherein said electrodynamic trap comprises electrodes to which a time-varying potential are applied to suspend said one or more charged particles in a quadrupole field subjecting said one or more charged particles to said electrodynamic forces that balance said one or more particles in stable equilibria against said inertial forces while the position or motion of said one or more charged particles is measured by said readout means.

13. An inertial sensor as set forth in claim 12 wherein said electrodes comprise a ring electrode and at least one additional electrode spaced from the plane containing said ring electrode and aligned with the axis of said ring electrode to which an oscillatory electrical potential is applied.

14. An inertial sensor as set forth in claim 12 wherein more than one charged particle are suspended in said trap and wherein said readout means detects variations in the relative positions occupied by different ones of said charged particles.

15. An inertial sensor as set forth in claim 13 wherein said quadrupole field elastically cons trains said one or more charged particles to a specific location between said electrodes by a substantially linear restoring force.

16. An inertial sensor as set forth in claim 15 wherein said trap further includes means for varying the effective spring constant of said substantially linear restoring farce to adjust the sensitivity of said inertial sensor.

17. An inertial sensor as set forth in claim 16 wherein said at least one additional electrode comprises a pair of end cap electrodes on opposing sides of said ring.

18. An inertial sensor as set fort in claim 17 wherein said end cap electrodes are hyperboloids.

19. An inertial sensor as set fort in claim 17 wherein said end cap electrodes are spherical.

20. An inertial sensor as set fort in claim 17 wherein said end cap electrodes are ring-shaped.

21. An inertial sensor as set forth in claim 16 wherein said at least one additional electrode comprises a second ring electrode.

22. An inertial sensor as set forth in claim 16 wherein said at least one additional electrode comprises a planar electrode positioned parallel to the plane of and spaced from said ring electrode.

23. An inertial sensor as set forth in claim 15 wherein said electrodynamic trap further includes means for varying the magnitude or the frequency of said oscillatory electrical potential to vary the effective spring constant of said substantially linear restoring force.

24. An inertial sensor as set forth in claim 12 wherein said one or more charged particles are constrained to a specific location between said electrodes at which said one or more charged particles are in stable equilibrium by a restoring force produced by said time-varying potential.

25. An inertial sensor as set forth in claim 24 wherein said readout device includes means for measuring the intensity of light scattered from said one or more charged particles.

26. An inertial sensor as set forth in claim 24 wherein said readout device measures variations in the position or motion of said one or more charged particles by producing data representing an image of said particles and processing said image data.

27. An inertial sensor as set forth in claim 24 wherein said readout device measures variations in the position or motion of said one or more charged particles by optical interferometry.

28. An inertial sensor as set forth in claim 8 wherein said one or more charged particles have a known mass and charge at the time said readout device measures said variations.

29. An inertial sensor as set forth in claim 28 wherein said one or more charged particles are ions.

30. An inertial sensor as set forth in claim 28 wherein said one or more charged particles are naturally monoisotropic ions.

31. An inertial sensor as set forth in claim 28 wherein said sensor includes means for adding a charge to said one or more charged particles prior to measuring said variations.

32. An inertial sensor as set forth in claim 31 wherein said one or more charged particles are conductive spheres.

33. An inertial sensor as set forth in claim 8 wherein said readout means detects displacements in the center of mass of said one or more charged particles caused by said acceleration.

34. An inertial sensor as set forth in claim 8 wherein said readout means detects an increase in the micromotion of said one or more charged particles caused by said acceleration.

35. An inertial sensor as set forth in claim 8 wherein said one or more charged particles occupy an asymmetrical orbit and wherein said readout means detects variations in the orientation of said asymmetrical orbit occupied by said one or more charged particles.

36. An inertial sensor as set forth in claim 12 wherein said electrodes are formed from conductive planar layers separated by insulating layers.

37. An inertial sensor as set forth in claim 12 wherein said electrodes are formed from the conductive layers in a printed circuit board.

38. An inertial sensor comprising an electrodynamic trap for suspending one or more particles and a readout device for measuring variations in the position or motion of said one or more charged particles when said electrodynamic trap is subjected to acceleration wherein more than one charged particle are suspended in said trap and wherein said readout means detects variations in the relative positions occupied by different ones of said charged particles.

39. An inertial sensor as set forth in claim 38 wherein said trap further includes means for damping the motion of said charged particles within said trap.

40. An inertial sensor as set forth in claim 39 wherein said means for damping includes a fluid medium within which said charged particles are suspended.

41. An inertial sensor as set forth in claim 39 wherein said readout device measures the amount of rotational acceleration causing said variations in the relative positions occupied by different ones of said charged particles.

* * * * *